(12) United States Patent
Grey et al.

(10) Patent No.: US 12,074,300 B2
(45) Date of Patent: Aug. 27, 2024

(54) METAL OXIDE-BASED ELECTRODE COMPOSITIONS

(71) Applicant: Cambridge Enterprise Limited, Cambridge (GB)

(72) Inventors: Clare Grey, Cambridge (GB); Kent Griffith, Evanston, IL (US)

(73) Assignee: CAMBRIDGE ENTERPRISE LIMITED, Cambridge (GB)

( * ) Notice: Subject to any disclaimer, the term of this patent is extended or adjusted under 35 U.S.C. 154(b) by 830 days.

(21) Appl. No.: 15/734,463

(22) PCT Filed: Jun. 7, 2019

(86) PCT No.: PCT/EP2019/065040
§ 371 (c)(1),
(2) Date: Dec. 2, 2020

(87) PCT Pub. No.: WO2019/234248
PCT Pub. Date: Dec. 12, 2019

(65) Prior Publication Data
US 2021/0218075 A1    Jul. 15, 2021

(30) Foreign Application Priority Data

Jun. 8, 2018 (GB) .................................... 1809467
Apr. 12, 2019 (GB) .................................... 1905218

(51) Int. Cl.
*H01M 10/44* (2006.01)
*H01M 4/48* (2010.01)
(Continued)

(52) U.S. Cl.
CPC .......... *H01M 10/44* (2013.01); *H01M 4/483* (2013.01); *H01M 4/485* (2013.01); *H01M 10/0525* (2013.01); *H01M 2004/021* (2013.01)

(58) Field of Classification Search
CPC .................................................... H01M 4/485
See application file for complete search history.

(56) References Cited

U.S. PATENT DOCUMENTS 4,542,083 A    9/1985  Cava et al.
6,391,496 B1 *  5/2002  Nakajima .............. C01G 33/00
                                                           429/231.1
(Continued)

FOREIGN PATENT DOCUMENTS

CN    109928750 A  *  6/2019
EP      2999032 A1     3/2016
(Continued)

OTHER PUBLICATIONS

Ye et al, Highly efficient lithium container based on non-Wadsley-Roth structure Nb18W16O93 nanowires for electrochemical energy storage, Electrochimic Acta, 292, 331-338. (Year: 2018).*

(Continued)

*Primary Examiner* — Amanda C. Walke
(74) *Attorney, Agent, or Firm* — CANTOR COLBURN LLP

(57) ABSTRACT

The invention provides a method of charging and/or discharging an electrochemical cell at a high rate, wherein the electrochemical cell has a working electrode comprising a niobium tungsten oxide and/or a niobium molybdenum oxide. The invention also provides an electrode comprising a niobium tungsten oxide wherein, the ratio of $Nb_2O_5$ to $WO_3$ is from 8:5 to 11:20, and an electrode comprising niobium molybdenum oxide, wherein the ratio of $Nb_2O_5$ to $MoO_3$ is from 6:1 to 1:3.

8 Claims, 24 Drawing Sheets

(51) Int. Cl.
  *H01M 4/485* (2010.01)
  *H01M 10/0525* (2010.01)
  *H01M 4/02* (2006.01)

(56) References Cited

U.S. PATENT DOCUMENTS

| | | | |
|---|---|---|---|
| 9,196,901 | B2 | 11/2015 | Se-Hee et al. |
| 2013/0266858 | A1 | 10/2013 | Inoue et al. |
| 2015/0056514 | A1 | 2/2015 | Dai et al. |
| 2015/0221933 | A1 | 8/2015 | Mizawa et al. |
| 2016/0351973 | A1 | 12/2016 | Albano et al. |
| 2017/0141386 | A1 | 5/2017 | Waseda et al. |
| 2017/0279117 | A1 | 9/2017 | Shindo et al. |
| 2019/0044179 | A1* | 2/2019 | Sugimori ............... H01M 4/131 |
| 2019/0097226 | A1 | 3/2019 | Kawasaki et al. |
| 2020/0152963 | A1* | 5/2020 | Zhang ................. H01M 4/0404 |

FOREIGN PATENT DOCUMENTS

| | | | | |
|---|---|---|---|---|
| EP | 3483955 | A1 | 5/2019 | |
| EP | 3522268 | A1 | 8/2019 | |
| GB | 2588264 | A * | 4/2021 | ........... C01G 33/006 |
| WO | WO-2017150020 | A1 * | 9/2017 | ............ H01M 10/05 |

OTHER PUBLICATIONS

Li et al, Nb2O5-Based Composite Electrodes for Dye-Sensitized Solar Cells, Chemistry of Materials, 23, 2292-2294 (Year: 2011).*
Cava et al., "Lithium Insertion in Wadsley-Roth Phases Based on NIobium Oxide", J. Electrochem. Soc., Dec. 1983, p. 2345-2351.
Third Party Observation for Application No. EP20190732275, issued on Aug. 4, 2021, 3 pages.
Cruz et al., (2003) "Electrochemical Lithium Insertion in Nb8—xW9+x047 (1<x<6)", Materials Research Bulletin, vol. 38, pp. 525-531.
Fuentes et al., (1996) "A Study of Lithium Insertion in W4Nb26O77: Synthesis and Characterization of New Phases" Solid State Ionics, vol. 92, pp. 103-111.
Fuentes et al., (1997) "Lithium and Sodium Insertion in W3Nb14O44, a Block Structure Type Phase", Solid State Ionics, vol. 93, pp. 245-253.
International Search Report and Written Opinion of the International Searching Authority for PCT/EP2019/065040 dated Oct. 8, 2019.
Montemayor et al., (1998) "Lithium Insertion in Two Tetragonal Tungsten Bronze Type Phases, M8W9O47 (M=Nb and Ta)", Journal of Materials Chemistry, vol. 8, pp. 2777-2781.
Saritha et al., (2010) "Electrochemical Li insertion studies on WNb12O33—A shear ReO3 type structure", Journal of Solid State Chemistry, vol. 183, pp. 988-993.
Search Report of the UKIPO for GB 1809467.2 dated Nov. 26, 2018.
Song et al., (2015) "A Mo-doped TiNb2O7 Anode for Lithium-ion Batteries with High Rate Capability due to Charge Redistribution", Chemical Communications, vol. 51, pp. 9849-9852.
Stephenson, (1968) "A Structural Investigation of Some Stable Phases in the Region Nb2O5.WO3—WO3", Acta Crystallographica B, vol. 24, pp. 673-653.
Third Party Observations on PCT/EP2019/065040 dated Mar. 23, 2020.
Waring, et al., (1966) "Phase Equilibria as Related to Crystal Structure in the System Niobium Pentoxide-Tungsten Trioxide", Journal of Research of the National Bureau of Standards A, vol. 70A, pp. 281-303.
Yamada et al., (1999) "Li-Intercalated ReO3-Type Solid Solutions in the Nb2O5—WO3 System", Materials Research Bulletin, vol. 34, pp. 955-962.
Yamada et al., (2001) "Lithium Insertion to ReO3-type Metastable Phase in the Nb2O—WO3 System", Solid State Ionics, vol. 140, pp. 249-255.

Yan et al., (2017) "Electrospun WNb12O33 Nanowires: Superior Lithium Storage Capability and their Working Mechanism", Journal of Materials Chemistry A, vol. 5, pp. 8972-8980.
AAA Electric Vehicle Range Testing: AAA proprietary research into the effect of ambient temperature and HVAC use on driving range and MPGe, American Automobile Association, Feb. 2019, 66 pages.
EPO Examination Report for EP Application No. 19 732 275.3, dated Dec. 6, 2021, 10 pages.
EPO Examination Report for EP Application No. 19 732 275.3, dated Jun. 22, 2022, 12 pages.
Griffith, K. J., et al., "Niobium tungsten oxides for high-rate lithium-ion energy storage," Nature, vol. 559, Jul. 26, 2018, pp. 556-563; supplementary information and extended data, 16 pages.
Ma, S., et al., Temperature effect and thermal impact in lithium-ion batteries: A review, Progress in Natural Science: Materials International, 28, 2018, pp. 653-666.
PCT International Search Report and Written Opinion, International Application No. PCT/EP2020/079253, International Filing Date Oct. 16, 2020, date of mailing Jan. 28, 2021, 14 pages.
Third-Party Observation on Application No. GB1914983.0, dated Mar. 30, 2022, 1 page.
UKIPO Examination Report for Application No. GB1914983.0, dated Nov. 24, 2021, 7 pages.
UKIPO Examination Report for Application No. GB1914983.0, dated May 3, 2022, 4 pages.
UKIPO Search Report for Application No. GB1914983.0, dated Feb. 13, 2020, 5 pages.
Allpress and Roth, "The Effect of Annealing on the Concentration of Wadsley Defects in the Nb2O2—WO3 System", J. Solid State Chem. 1971, 3, 209-216.
Arbi, et al., "Ionic mobility in Nasicon-type LiMIV2(PO4)3 materials followed by 7Li NMR spectroscopy", MRS Online Proc. Libr. Arch. 2011, 1313.
Bork and Heitjans, "NMR Relaxation Study of Ion Dynamics in Nanocrystalline and Polycrystalline LiNbO3", J. Phys. Chem. B 1998, 102, 7303-7306.
Downiem et al., "In Situ Detection of Lithium Plating on Graphite Electrodes by Electrochemical Calorimetry", J. Electochem. Soc. 2013, 160, A588-A570.
Gobet, et al., "Structural Evolution and Li Dynamics in Nanophase Li3PS4 by Solid-State and Pulsed-Field Gradient NMR", Chem. Mater. 2014, 26, 3558-3564.
Griffith, et al., "Structural Stability from Crystallographic Shear in TiO2—Nb2O5 Phases: Cation Ordering and Lithiation Behavior of TiNb24O62", Inorg. Chem. 2017, 56, 4002-4010.
Hayamizu and Aihara, "Lithium ion diffusion in solid electrolyte (Li2S)7(P2S5)3 measured by pulsed-gradient spin-echo 7Li NMR spectroscopy", Solid State Ion. 2013, 238, 7-14.
Hayamizu, et al., "Lithium ion diffusion measurements on a garnet-type solid conductor Li6.6La3Zr1.6Ta0.4O12 by using a pulsed-gradient spin-echo NMR method", Solid State Nucl. Magn. Reson. 2015, 70, 21-27.
Hayamizu, et al., "NMR studies on lithium ion migration in sulfide-based conductors, amorphous and crystalline Li3PS4", Solid State Ion. 2016, 285, 51-58.
Hayamizu, et al., "Long-range Li ion diffusion in NASICON-type Li1.5Al0.5Ge1.5(PO4)3 (LAGP) studied by 7Li pulsed-gradient spin-echo NMR", Phys. Chem. Chem. Phys. 2017, 19, 23483-23491.
He at al., "Gassing in Li4Ti5O12-based batteries and its remedy", Sci. Rep. 2012, 2, 913.
Holzmann, et al. "Li0.6[Li0.2Sn0.8S2]—a layered lithium superionic conductor", Energy Environ. Sci. 2016, 9, 2578-2585.
Ishiyama, et al., "Nanoscale diffusion tracing by radioactive 8Li tracer", Jpn. J. Appl. Phys. 2014, 53, 110303.
Ishiyama, et al., "Direct measurement of nanoscale lithium diffusion in solid battery materials using radioactive tracer of BLi", Nucl. Instrum. Methods Phys. Res. Sect. B Beam Interact. Mater. At. 2016, 376, 379-381.
Kasnatscheew, et al., "A Tutorial into Practical Capacity and Mass Balancing of Lithium Ion Batteries", J. Electrochem. Soc. 2017, 164, A2479-A2486.

(56) References Cited

OTHER PUBLICATIONS

Kim, et al., "Mechanism of Phase Propagation During Lithiation in Carbon-Free Li 4 Ti 5 O 12 Battery Electrodes", Adv. Funct. Mater. 2013, 23, 1214-1222.

Kuhn, et al., "Li self-diffusion in garnet-type Li7La3Zr2O12 as probed directly by diffusion-induced 7Li spin-lattice relaxation NMR spectroscopy", Phys. Rev. B 2011, 83, 094302.

Kuhn, et al., "Tetragonal Li10GeP2S12 and Li7GePS8—exploring the Li on dynamics in LGPS Li electrolytes", Energy Environ. Sci. 2013, 6, 3548-3552.

Kuhn, et al., "A new ultrafast superionic Li-conductor: ion dynamics in Li11Si2PS12 and comparison with other tetragonal LGPS-type electrolytes", Phys. Chem. Chem. Phys. 2014, 16, 14669-14674.

Langer et al., "Lithium motion in the anode material LiC6 as seen via time-domain 7Li NMR", Phys. Rev. B 2013, 88, 094304.

Lv, et al., "Review—Gassing Mechanism and Suppressing Solutions in Li4Ti5O12-Based Lithium-Ion Batteries", J. Electrochem. Soc. 2017, 164, A2213-A2224.

Mali, et al., "6Li and 7Li diffusion coefficients in solid lithium measured by the NMR pulsed field gradient technique", J. Phys. F Met. Phys. 1988, 18, 403-412.

Odziomek, et al., "Hierarchically structured lithium titanate for ultrafast charging in long-life high capacity batteries", Nat. Commun. 2017, 8, 15636.

Oszajca, et al., "Precisely Engineered Colloidal Nanoparticles and Nanocrystals for Li-Ion and Na-Ion Batteries: Model Systems or Practical Solutions?", Chem. Mater. 2014, 26, 5422-5432.

Palacin, et al., "Nanomaterials for Electrochemical Energy Storage: the Good and the Bad", Acta Chim. Solv. 2016, 63, 417-423.

Roth and Wadsley, "Multiple Phase Formation in the Binary System Nb2Os—WO3. I. Preparation and Identification of Phases", Acta Crystallogr. 1965, 19, 26-32.

Roth and Wadsley, "Multiple Phase Formation in the Binary System Nb2Os—WO3 II. The Structure of the Monoclinic Phases WNb12O33 and W5Nb16O55", Acta Crystallogr. 1965, 19, 32-38.

Ruprecht, et al., "Extremely slow Li ion dynamics in monoclinic Li2TiO3—probing macroscopic jump diffusion via 7Li NMR stimulated echoes", Phys. Chem. Chem. Phys. 2012, 14, 11974-11980.

Ruprecht and Heitjans, "Ultraslow Lithium Diffusion in Li3NbO4 Probed by 7Li Stimulated Echo NMR Spectroscopy", Diffusion Fundamentals 2010, 12, 101.

Sugiyama, et al., "Li-ion diffusion in Li4Ti5O12 and LiTi2O4 battery materials detected by muon spin spectroscopy", Phys. Rev. B 2015, 92, 014417.

Sun, et al., "Three-dimensional holey-graphene/ niobia composite architectures for ultrahigh-rate energy storage", Science 2017, 356, 599-604.

Toby and Von Dreele, "GSAS-II: the genesis of a modern open-source all purpose crystallography software package", J. Appl. Crystallogr. 2013, 46, 544-549.

Verhoevenm, et al. "Lithium Dynamics in LiMn2O4 Probed Directly by Two-Dimensional 7Li NMR", Phys. Rev. Lett. 2001, 86, 4314-4317.

Wagemaker, et al., "Two Phase Morphology Limits Lithium Diffusion in TiO2 (Anatase): A 7Li MAS NMR Study", J. Am. Chem. Soc. 2001, 123, 11454-11461.

Wagemaker, et al., "The Influence of Size on Phase Morphology and Li-Ion Mobility in Nanosized Lithiated Anatase TiO2", Chem. Eur. J. 2007, 13, 2023-2028.

Wang, et al., "A robust strategy for crafting monodisperse Li4Ti5O12 nanospheres as superior rate anode for lithiumionbatteries", Nano Energy, 2016, 21, 133-144.

Wilkening, et al. "Microscopic Li self-diffusion parameters in the lithiated anode material Li4+xTi5O12 (0≤x ≤3) measured by 7Li solid state NMR", Phys. Chem. Chem. Phys. 2007, 9, 6199-6202.

Wu, at al., "Stable cycling of double-walled silicon nanotube battery anodes through solid-electrolyte interphase control", Nat. Nanotechnol. 2012, 7, 310-315.

Zaghib, et al., "Advanced Electrodes for High Power Li-ion Batteries", Mater. Basel Switz. 2013, 6, 1028-1049.

Zhao, at al., "Fracture of electrodes in lithium-ion batteries caused by fast charging", J. Appl. Phys. 2010, 108, 073517.

\* cited by examiner

METAL OXIDE-BASED ELECTRODE COMPOSITIONS

RELATED APPLICATION

This present case is related to, and claims the benefit of, GB 1809467.2 filed on 8 Jun. 2018 (08.06.2018) and GB 1905218.2 filed on 12 Apr. 2019 (12.04.2019), the contents of which are hereby incorporated by reference in their entirety.

FIELD OF THE INVENTION

The present invention provides an electrode and an electrochemical cell, such as a lithium ion battery, comprising the electrode, together with methods for using the electrode within the electrochemical cell.

BACKGROUND

High-rate lithium ion battery electrode materials can store large quantities of charge in a few minutes of charging, rather than hours. Such materials are required to alleviate the technological challenges associated with the adoption of electric vehicles and grid-scale batteries, and to enable new power-intensive devices.

The most intuitive and commonly used approach to increase the rate performance of an electrode material is to create a nanosized or porous (and often hierarchical) structure. This minimizes the lithium ion solid-state diffusion distance, enabling more rapid lithium ion transport through the electrode and increasing the surface area of electrode materials in contact with electrolyte. Carbonaceous hierarchical structures and carbon-coating are also frequently employed to improve electronic conductivity, which is another prerequisite for high-rate applications.

In practice, despite excellent lithium ion mobility, graphite cannot be used at high-rates due to particle fracture and the risk that lithium dendrites form, leading to short circuits and the risk of fires and explosions (Zhao, et al.; Downie, et al.). The latter issue inherently limits the use of low voltage anodes in high-rate applications, since the electrode inhomogeneity, or any source of increased overpotential, can lead to lithium plating potentials on the surface of the low-voltage electrode (Downie, et al.).

$Li_4Ti_5O_{12}$ (lithium titanate; LTO), with an average voltage of 1.55 V against $Li^+/Li$, enables high-rate (de)intercalation without the risk of lithium dendrites or substantial solid-electrolyte interphase (SEI) formation, albeit with an undesirable but necessary decrease in full-cell voltage and thus energy density. However, even in this well-established "high-rate" anode, the capacity of 1 μm particles from solid-state synthesis reaches only 60-65 mA·h·g$^{-1}$ at a rate of 10C (Kim, et al.).

A number of strategies have been proposed to increase the capacity of LTO electrodes at high C-rates, and present carbon-coated nanoparticles of LTO can reach at least 150 mA·h·g$^{-1}$ at 10C (Wang et al.; Odziomek, et al.). This corresponds to approximately 0.5 lithium ions per transition metal ($Li^+$/TM).

However, using nanostructured and porous materials for electrochemical energy storage applications inherently results in a severe penalty in terms of volumetric energy density. Furthermore, these carefully designed porous and nanoarchitectures are time consuming and expensive to synthesize, characterize, and manufacture. Synthesis methods often result in relatively low yields and/or large quantities of chemical waste generation (Oszajca, et al.). Moreover, these porous and nanoarchitectures are also susceptible to degradation during electrochemical cycling from processes such as catalytic decomposition of electrolyte (Palacin et al.), morphological changes that result in loss of nanostructuring (Wu et al.), and higher first cycle capacity loss (Kasnatscheew et al.).

Another problem with the use of nano-LTO electrodes in a full cell is gas evolution during repeated charging and discharging cycles, and the associated swelling or pressure build-up. This arises from heterogeneous catalysis between the metal oxide surface and organic electrolyte (He et al.; Lv, et al.). The small particle sizes required to compensate for poor lithium ion and electron diffusion in LTO increase the reactive surface area, exacerbating this problem.

Fast charging or high-power delivery from a full cell also requires a cathode to match the anode. $LiFePO_4$ has been used as a promising high-rate cathode (Zaghib, et al.). However, both $LiFePO_4$ and LTO have exceptionally flat voltage profiles. This combination provides a constant voltage but presents a serious challenge in terms of battery management systems (BMS). Simple and accurate BMS is a crucial factor for battery applications in electric vehicles and mobile technology and is even more important at high-rates to prevent dangerous and degradative over(dis) charging while maximizing utility. BMS rely on the ability to measure state-of-charge, which cannot be done simply by charge counting alone as the battery degrades and electron-consuming side reaction occur.

In light of the above challenges, there is a need to provide new electrode materials for lithium ion batteries that are capable of operating at high rates.

SUMMARY OF THE INVENTION

The invention generally provides an electrode comprising niobium tungsten oxide, an electrochemical cell comprising the electrode, and the use of the cell, for example, in a lithium ion battery, at high C-rates of 5C or more, such as 10C or more, during charging and/or discharging.

The present inventors have established that extremely high volumetric energy densities and impressive charging and discharging rates can be achieved using electrode materials comprising niobium tungsten oxides in a high-rate lithium ion cell. The niobium tungsten oxides have favorable lithium diffusion properties, and thus exhibit superior performance. Above 1.0 V vs. Li$^+$/Li, the formation of SEI is minimal, which means that lithium will not be lost into side reactions with the electrolyte.

In addition, a high-rate lithium ion cell using electrode materials comprising niobium tungsten oxide can operate above 1.3 V. (For example, the average voltage of $Nb_{16}W_5O_{55}$ is 1.57 V vs Li$^+$/Li and the average voltage of $Nb_{18}W_{16}O_{93}$ is 1.67 V vs Li$^+$/Li). Operating in this voltage range negates the need to perform an initial formation cycle, simplifying the cell manufacturing process. A typical lithium-ion cell comprising a graphite electrode operates below 1.3 V and must undergo an initial formation cycle before the cell is sealed. Typically, this formation cycle takes place at elevated temperature, for example 60° ° C., in order to allow degassing to occur. This adds signification time and cost to the cell manufacturing process.

Furthermore, in a full cell against e.g. $LiFePO_4$, LIN $(CF_3SO_2)_2$ (LiTFSI) can be used to replace the more toxic $LiPF_6$ electrolyte salt commonly used in standard commercial electrolytes. Moreover, aluminum can be used as the current collector instead of the more expensive copper while avoiding LiAl alloying potentials (≤0.3 V vs. Li$^+$/Li).

The use of a niobium tungsten oxide as an electrode material, for example in a high-rate lithium cell, allows the open-circuit voltage to be used as a measure of state-of-charge. This has the potential to provide a simple and reliable BMS, which may prove to be a significant advantage for high power/fast charging applications.

In a first aspect of the invention there is provided a method of charging and/or discharging an electrochemical cell at a C-rate of at least 5C, such as at least 10C, wherein the electrochemical cell has a working electrode comprising niobium tungsten oxide.

The electrochemical cell may contain a counter electrode and an electrolyte, and optionally the electrodes are connectable to or are in connection with a power supply.

The method may be a method of charging and/or discharging an electrochemical cell at a current density of at least 750 mA·g$^{-1}$, such as at least 800 mA·g$^{-1}$.

The method may involve a cycle of charging and discharging or discharging and charging the electrochemical cell, and the method may comprise 2 cycles or more, 5 cycles or more, 10 cycles or more, 50 cycles or more, 100 cycles or more, 500 cycles or more, 1,000 cycles or more, or 2,000 cycles or more.

In one embodiment, the working electrode does not have a porous nor hierarchical structure.

The working electrode may comprise the niobium tungsten oxide in particulate form. For example, the niobium tungsten oxide may have a primary particle size of at least 1 μm.

The smaller surface area of the particulate niobium tungsten oxides decreases side reactions and mitigates the problems of gas evolution and the associated swelling or pressure build-up observed with nano-LTO electrodes. Moreover, particulate niobium tungsten oxides can be quickly and easily prepared using solid state synthesis.

The working electrode may have a solid-state lithium diffusion coefficient (Du) of less than $10^{-14}$ m$^2$·s$^{-1}$ at 298 K, such as less than $10^{-15}$ m$^2$·s$^{-1}$ at 298 K.

The favorable lithium diffusion properties allow micrometer-sized particles of niobium tungsten oxide to be used at extremely high rates.

The working electrode may have a capacity of 50 mA·h·g$^{-1}$ at 20C. For example, 75 mA·h·g$^{-1}$ at 20C or 50 mA·h·g$^{-1}$ at 60C.

The molar ratio of Nb$_2$O$_5$ to WO$_3$ in the working electrode may be from 6:1 to 1:15. For example, from 8:5 to 11:20.

The working electrode may comprise a niobium tungsten oxide selected from the group consisting of Nb$_{12}$WO$_{33}$, Nb$_{26}$W$_4$O$_{77}$, Nb$_{14}$W$_3$O$_{44}$, Nb$_{16}$W$_5$O$_{55}$, Nb$_{18}$W$_8$O$_{69}$, Nb$_2$WO$_8$, Nb$_{18}$W$_{16}$O$_{93}$, Nb$_{22}$W$_{20}$O$_{115}$, Nb$_8$W$_9$O$_{47}$, Nb$_{54}$W$_{82}$O$_{381}$, Nb$_{20}$W$_{31}$O$_{143}$, Nb$_4$W$_7$O$_{31}$, or Nb$_2$W$_{15}$O$_{50}$. For example, Nb$_{16}$W$_5$O$_{55}$, Nb$_{18}$W$_8$O$_{69}$, Nb$_2$WO$_8$, Nb$_{18}$W$_{16}$O$_{93}$ or Nb$_{22}$W$_{20}$O$_{115}$.

Additionally, the working electrode may comprise a mixture of niobium tungsten oxide and an additional active material. For example, the working electrode may comprise a mixture of niobium tungsten oxide and LTO. The ratio of niobium tungsten oxide to LTO may be from 95:5 to 5:95 by weight. For example, the ratio may be from 90:10 to 10:90 by weight, from 80:20 to 20:80 by weight, from 70:30 to 30:70 by weight, from 60:40 to 40:60 by weight or the ratio of niobium tungsten oxide to LTO may be 1:1 by weight.

In a further aspect of the invention, there is provided an electrode, which may be referred to as a working electrode, comprising a niobium tungsten oxide, such as wherein the molar ratio of Nb$_2$O$_5$ to WO$_3$ in the electrode is from 8:5 to 11:20. The working electrode is suitable for use in a lithium ion battery.

The working electrode may comprise a niobium tungsten oxide selected from Nb$_{16}$W$_5$O$_{55}$, Nb$_{18}$W$_8$O$_{69}$, Nb$_2$WO$_8$, Nb$_{18}$W$_{16}$O$_{93}$ or Nb$_{22}$W$_{20}$O$_{115}$. For example Nb$_{16}$W$_5$O$_{55}$ or Nb$_{18}$W$_{16}$O$_{93}$.

In one embodiment, the working electrode does not have a porous nor hierarchical structure.

The working electrode may comprise a niobium tungsten oxide in particulate form. For example, the niobium tungsten oxide may have a primary particle size of at least 1 μm.

Additionally, the working electrode may comprise a mixture of niobium tungsten oxide and an additional active material. For example, the working electrode may comprise a mixture of niobium tungsten oxide and LTO. The ratio of niobium tungsten oxide to LTO may be from 95:5 to 5:95 by weight. For example, the ratio may be from 90:10 to 10:90 by weight, from 80:20 to 20:80 by weight, from 70:30 to 30:70 by weight, from 60:40 to 40:60 by weight or the ratio of niobium tungsten oxide to LTO may be 1:1 by weight.

In a further aspect of the invention, there is provided an electrochemical cell comprising the working electrode of the invention.

In a further aspect of the invention, there is provided a lithium ion battery comprising one or more electrochemical cells of the invention. Where there are a plurality of cells, these may be provided in series or parallel.

In a further aspect of the invention there is provided the use of a working electrode comprising a niobium tungsten oxide in a high-rate electrochemical cell, for example wherein the cell is operated at a C-rate of at least 5C, such as at least 10C.

In a further aspect of the invention, there is provided a method of charging and/or discharging an electrochemical cell at a C-rate of at least 5C, such as at least 10C, wherein the electrochemical cell has a working electrode comprising niobium molybdenum oxide.

The present inventors have found that high energy densities and impressive rates can be achieved using electrode materials comprising niobium molybdenum oxides in a high rate lithium ion battery. The niobium molybdenum oxides display a higher average voltage in comparison to common high-rate anode materials, and so reaction with the electrolyte is avoided or minimized.

In a further aspect of the invention, there is provided an electrode, which may be referred to as a working electrode, comprising a niobium molybdenum oxide, such as wherein the molar ratio of Nb$_2$O$_5$ to MoO$_3$ in the electrode is from 6:1 to 1:3, for example 1:3. The working electrode is suitable for use in a lithium ion battery.

The working electrode may comprise a niobium molybdenum oxide selected from Nb$_2$Mo$_3$O$_{14}$, Nb$_{14}$Mo$_3$O$_{44}$ or Nb$_{12}$MoO$_{44}$. For example Nb$_2$Mo$_3$O$_{14}$.

These and other aspects and embodiments of the invention are described in more detail below.

SUMMARY OF THE FIGURES

FIG. 6 is a comparison of Cu foil to carbon-coated Al foil current collector.

FIGS. 19(D-F) shows the rate performance of a cell comprising a $Nb_{16}W_5O_{55}$ anode and NMC622 cathode; order of cures in (E): capacity (topmost, sloping); coulombic efficiency (lower, horizontal).

DETAILED DESCRIPTION OF THE INVENTION

Figure 1A:
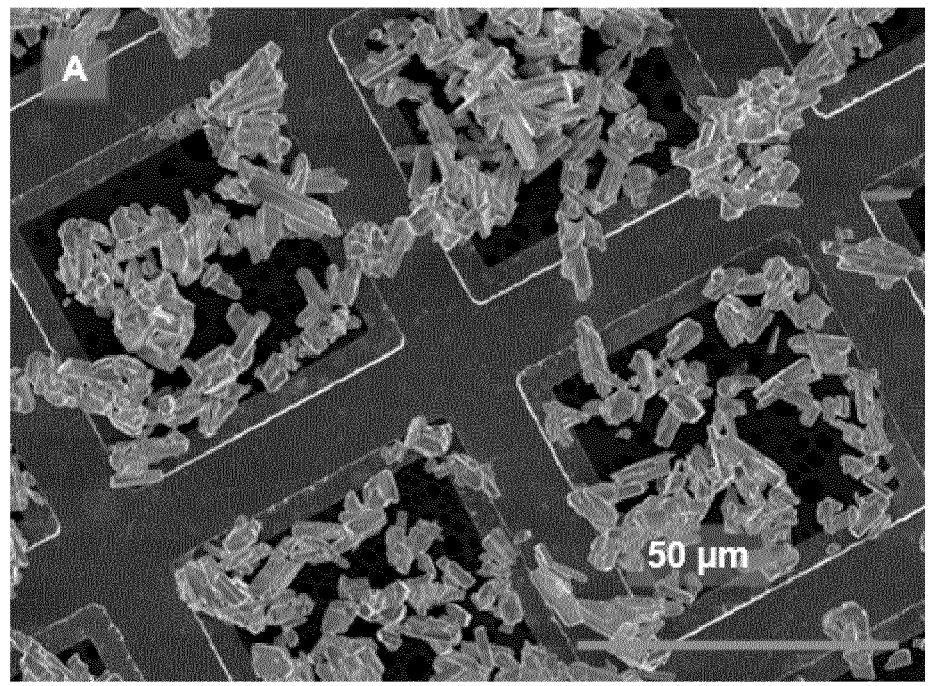
FIG. 1 is a wide-field SEM image of (A) Nb$_{16}$W$_5$O$_{55}$ and (B) Nb$_{18}$W$_{16}$O$_{93}$ at a low magnification to show the roughly uniform particle size and presence of agglomerates. The background of (A) is a Cu grid and of (B) is adhesive carbon. The scale bars are 50 μm in both images.

The invention generally provides an electrode comprising a niobium tungsten oxide, an electrochemical cell comprising the electrode, and the use of the cell, for example, in a lithium ion battery, at high C-rates of 5C during charging and/or discharging.

The preparation of $Nb_{16}W_5O_{55}$ has previously been described by, amongst others, Roth and Wadsley. The preparation of $Nb_{18}W_{16}O_{93}$ has previously been described by, amongst others, Stephensen. However, the electrochemical properties of $Nb_{16}W_5O_{55}$ and $Nb_{18}W_{16}O_{93}$ are not described in these documents.

Electrodes comprising $Nb_8W_9O_{47}$ (Montemayor et al.); $Nb_{26}W_4O_{77}$ (Fuentes et al.); $Nb_{14}W_3O_{44}$ (Fuentes et al.); and $Nb_xW_{1-x}O_{3-x/2}$, wherein $0 \leq x \leq 0.25$ (Yamada et el.), have been previously described. However, the capacity of the materials against the C-rate was not measured.

Electrodes comprising $Nb_{8-x}W_{9-x}O_{47}$, wherein $1 \leq x \leq 6$, have been described by Cruz et el. However, the electrochemical cell comprising the electrodes is used under limited conditions, and there is no disclosure of the cell operating under high-rate conditions. Moreover, the authors report that irreversible structural transformations in the matrix-host result in loss of capacity after the first cycle.

Electrodes comprising $Nb_{12}WO_{33}$ have been described by Saritha et al. and Yan et al. Yan et al. test an electrochemical cell comprising a electrospun $Nb_{12}WO_{33}$ electrode at a maximum current density of 700 mA·g⁻¹ (corresponding to a C-rate of 3.6C). Saritha et al. test an electrochemical cell comprising $Nb_{12}WO_{33}$ at a reported C-rate of no more than 20C.

However, Saritha et al. apparently define the C-rate as reaction (i.e. removal or insertion) of one lithium ion in one hour. This corresponds to one electron transfer per formula unit. Thus, the 20C rate for $Nb_{12}WO_{33}$ reported by Saritha et al. corresponds to 1.54C using the convention defined in this work (equivalent to 294 mA·g⁻¹).

The present inventors have developed electrodes comprising a niobium tungsten oxide that has favorable lithium ion diffusion properties, and thus exhibit superior performance even with micron sizes particles. The electrodes exhibit extremely high volumetric energy densities and high capacities at high rates of charging and discharging.

The voltage values described herein are made with reference to Li⁺/Li, as is common in the art.

The C-rate is a measure of the rate at which a battery is discharged relative to its maximum capacity. The C-rate may be defined as the inverse of the number of hours to reach a defined theoretical capacity e.g., 10C corresponds to a 6 min discharge or charge time. In this work, C-rate is defined relative to one electron transfer per transition metal, e.g., for $Nb_{16}W_5O_{55}$, 1C=171.3 mA·h·g⁻¹, 20C=3426 mA·h·g⁻¹. The theoretical capacity is calculated by:

$$Q_{theoretical} = \frac{nF}{3.6 \, m} = \frac{21 \cdot 96485.3 [C \cdot mol^{-1}]}{3.6 [C \cdot mA^{-1} \cdot h^{-1}] \cdot 3285.65 [g \cdot mol^{-1}]} = 171.3 \, mA \cdot h \cdot g^{-1}$$

where n is the number of electrons transferred per formula unit, F is Faraday's constant, 3.6 is a conversion factor between Coulombs and the conventional mA·h·g⁻¹, and m is the mass per formula unit. Thus, a 1C rate corresponds to the reaction (i.e. insertion or removal) of 21 lithium ions per formula unit of $Nb_{16}W_5O_{55}$ in one hour, as this material contains 21 transition metals per formula unit.

The high-rate application may also be described by reference to (gravimetric) current density, for example where the current density is at least 800 mA·g⁻¹ or 1000 mA·g⁻¹. Current density is related to C-rate by:

$$\frac{\text{current density}(mA \cdot g^{-1})}{\text{capacity}(mA \cdot h \cdot g^{-1})} = \frac{1}{h} = C$$

Thus, for $Nb_{16}W_5O_{55}$ a current density of 800 mA·g⁻¹ corresponds to a C-rate of 4.67C and for $Nb_{18}W_{16}O_{93}$ a current density of 800 mA·g⁻¹ corresponds to a C-rate of 5.36C using the convention defined in this work.

All (gravimetric) capacities are quoted based on the mass of the active electrode material.

Working Electrode

The invention provides a working electrode comprising a niobium tungsten oxide. The working electrode is electrically conductive, and is electrically connectable to a counter electrode, for example within an electrochemical cell.

The working electrode may be an anode or cathode during a discharge step, for example in a lithium ion battery. Typically, the working electrode is the anode during a discharge step.

Typically, the working electrode for use in the method comprises a molar ratio of $Nb_2O_5$ to $WO_3$ from 6:1 to 1:15. Preferably, the molar ratio of $Nb_2O_5$ to $WO_3$ in the working electrode is from 8:5 to 11:20.

Typically, the working electrode for use in the method comprises a niobium tungsten oxide selected from $Nb_{12}WO_{33}$, $Nb_{26}W_4O_{77}$, $Nb_{14}W_3O_{44}$, $Nb_{16}W_5O_{55}$, $Nb_{18}W_8O_{69}$, $Nb_2WO_8$, $Nb_{18}W_{16}O_{93}$, $Nb_{22}W_{20}O_{115}$, $Nb_8W_9O_{47}$, $Nb_{54}W_{82}O_{381}$, $Nb_{20}W_{31}O_{143}$, $Nb_4W_7O_{31}$, or $Nb_2W_{15}O_{50}$ or combinations thereof. Preferably, the working electrode comprises $Nb_{16}W_5O_{55}$, $Nb_{18}W_8O_{69}$, $Nb_2WO_8$, $Nb_{18}W_{16}O_{93}$ or $Nb_{22}W_{20}O_{115}$ or combinations thereof.

Typically, the molar ratio of $Nb_2O_5$ to $WO_3$ in the working electrode is from 8:5 to 11:20. Preferably, the molar ratio of $Nb_2O_5$ to $WO_3$ in the working electrode is 8:5 or 9:16.

Typically, the working electrode comprises $Nb_{16}W_5O_{55}$, $Nb_{18}W_8O_{69}$, $Nb_2WO_8$, $Nb_{18}W_{16}O_{93}$, Or $Nb_{22}W_{20}O_{115}$, or combinations thereof. Preferably the working electrode comprises $Nb_{16}W_5O_{55}$ or $Nb_{18}W_{16}O_{93}$, or combinations thereof.

Optionally, the working electrode comprises a mixture of niobium tungsten oxide and an additional active material.

The additional active material may be an additional metal oxide. For example, the working electrode may comprise a mixture of niobium tungsten oxide and an additional active material selected from lithium titanate (LTO; $Li_4Ti_5O_{12}$), titanium niobium oxides (for example $TiNb_2O_7$), titanium tantalum oxides (for example $TiTa_2O_7$), tantalum molybdenum oxides (for example $Ta_8W_9O_{47}$) and niobium molybdenum oxides (for example $Nb_2Mo_3O_{14}$).

Graphite may also be used as an additional active material. A working electrode comprising a mixture of niobium tungsten oxide and graphite is cheaper to produce while maintaining the beneficial properties outlined above.

Preferably, the working electrode comprises a mixture of niobium tungsten oxide and LTO. The ratio of niobium tungsten oxide to LTO may be from 95:5 to 5:95 by weight. For example, the ratio may be from 90:10 to 10:90 by weight, from 80:20 to 20:80 by weight, from 70:30 to 30:70 by weight, from 60:40 to 40:60 by weight or the ratio of niobium tungsten oxide to LTO may be 1:1 by weight.

Preferably, the working electrode consists essentially of niobium tungsten oxide and an additional active material. For example, the working electrode consists essential of a mixture of niobium tungsten oxide and LTO.

Typically, the working electrode does not have a porous nor hierarchical structure. For example, the electrode material may have a specific surface area of less than 20 $m^2 \cdot g^{-1}$, less than 10 $m^2 \cdot g^{-1}$, less than 5 $m^2 \cdot g^{-1}$, less than 3 $m^2 \cdot g^{-1}$, less than 2 $m^2 \cdot g^{-1}$ or less than 1 $m^2 \cdot g^{-1}$.

The specific surface area of the electrode material may be known, or it may be determined using standard techniques such as $N_2$ adsorption isotherm analysis and Brunauer-Emmett-Teller (BET) theory.

Alternatively, the working electrode may have a porous structure. For example, the working electrode may have a specific surface area of at least 50 $m^2 \cdot g^{-1}$, at least 60 $m^2 \cdot g^{-1}$, 70 $m^2 \cdot g^{-1}$, 80 $m^2 \cdot g^{-1}$, 90 $m^2 \cdot g^{-1}$, 100 $m^2 \cdot g^{-1}$, 150 $m^2 \cdot g^{-1}$, 200 $m^2 \cdot g^{-1}$, 300 $m^2 \cdot g^{-1}$, or 400 $m^2 \cdot g^{-1}$.

The working electrode may have a pore volume of at least 0.1 $cm^3 \cdot g^{-1}$, at least 0.2 $cm^3 \cdot g^{-1}$, at least 0.4 $cm^3 \cdot g^{-1}$, at least 0.5 $cm^3 \cdot g^{-1}$, at least 0.7 $cm^3 \cdot g^{-1}$, at least 0.8 $cm^3 \cdot g^{-1}$, at least 0.9 $cm^3 \cdot g^{-1}$, at least 1.0 $cm^3 \cdot g^{-1}$, at least 1.5 $cm^3 \cdot g^{-1}$ or at least 2.0 $cm^3 \cdot g^{-1}$.

The pore volume of the electrode material may be known, or it may be determined using standard techniques such as $N_2$ adsorption isotherm analysis and Barrett-Joyner-Halenda (BJH) theory.

The porous working electrode may have an average pore size (largest cross section) of at least 1 nm, at least 5 nm, at least, 10 nm, at least 20 nm, at least 30 nm, at least 40 nm, at least 50 nm or at least 100 nm.

The porous working electrode may have macroporous structure. Thus, the porous working electrode may contain pores having pores having a largest cross section of at least 200 nm, at least 500 nm, at least 1 μm, or at least 5 μm.

The pore size of the electrode material may be known, or it may be determined using standard techniques such as scanning electron microscopy (SEM).

The working electrode may additionally comprise porous carbon, such as porous reduced graphene oxide.

Electrodes comprising porous carbon are generally light and conductive, and can provide large pore volumes, which can allow rapid transport of lithium ions and electrons to the active materials. They may also increase the electrochemical capacity of the working device.

The working electrode may additionally comprise reduced graphene oxide, Ketjen black or Super P carbon.

Alternatively, the working electrode may have a hierarchical structure. For example, the working electrode may additionally comprise hierarchical reduced graphene oxide (rGO).

Typically, the working electrode comprise a niobium tungsten oxide in particulate form. The size of the niobium tungsten oxide particles of the working electrode may be known, or it may be determined using standard techniques such as SEM.

Typically, the niobium tungsten oxide particles of the working electrode have primary particle size of at least 1 μm. The primary particle size is the size of the individual crystallite. It is the smallest identifiable subdivision in a particulate system. For example, the niobium tungsten oxide particles have a primary particle size of at least 2 μm, 3 μm, 4 μm, 5 μm or 10 μm.

The individual niobium tungsten oxide particles may agglomerate to form secondary particles. Typically, the niobium tungsten oxide particles have an agglomerate (secondary) particle size of at least 5 μm. More preferably, the niobium tungsten oxides have an agglomerate particle size of at least 10 μm, 15 μm, 20 μm, 25 μm or 30 μm.

Where present, the additional active material may be in particulate form. The size of the additional active material particles may be known, or it may be determined using standard techniques such as SEM.

Preferably, the additional active material particles have a primary particle size of 1 μm or less. For example, the additional active material particles have a primary particle size of 800 nm or less, 750 nm or less, 700 nm or less, 600 nm or less, 500 nm or less, 400 nm or less, 300 nm or less, 200 nm or less or 150 nm or less. Particulate lithium titanate typically has a particle size within this range.

Electrodes comprising a mixture of niobium tungsten oxide and an additional active material having partial sizes within the ranges described above can be charged and discharged at very high C-rates and at very high charge densities.

To improve conductivity at the working electrode, a conductive carbon material (e.g., carbon black, graphite, nanoparticulate carbon powder, carbon fiber and/or carbon nanotubes) is typically admixed with the working electrode material. Alternatively, the conductive carbon material may be coated onto the working electrode material. In one embodiment, the working electrode comprises porous carbon, such as porous reduced graphene oxide, which may wrap the larger niobium oxides particles.

Typically, the working electrode contains 1-5% by weight of binders.

The electrode may consist essentially of niobium tungsten oxide.

Alternatively, the working electrode is admixed with a binder or adhesive. Some examples of binders or adhesives include PVDF, PTFE, CMC, PAA, PMMA, PEO, SBR and co-polymers thereof.

The working electrode is typically fixed to a current collector, such as a copper or aluminum collector, which may be in the form of a plate.

The inventors have assessed a working electrode comprising a particulate niobium tungsten oxide using a standard electrode configuration of 8:1:1 active material/carbon/binder with a 2-3 mg·$cm^2$ loading of active material and a 1.27 $cm^2$ electrode area against a lithium counter electrode in a 2032-type coin cell geometry and using 1.0 M $LiPF_6$ in ethylene carbonate/dimethyl carbonate as electrolyte.

Under these conditions, the inventors have found that a working electrode comprising a niobium tungsten oxide can maintain a capacity of up to 150 mA·h·g$^{-1}$ at 10C for 1000 cycles, and a capacity of up to 125 mA·h·g$^{-1}$ at 20C for 750 cycles.

In addition, the inventors have found that a working electrode comprising a niobium tungsten oxide has a sloping, rather than flat, voltage profile.

The inventors have assessed solid-state lithium diffusion within niobium tungsten oxides using both pulsed field gradient NMR (PFG NMR) and the galvanostatic intermittent titration technique (GITT). The inventors have found that the niobium tungsten oxides have a solid-state lithium diffusion coefficient (Dui) of 10$^{-13}$ to 10$^{-12}$ m$^2$·s$^{-1}$ at 298 K. This corresponds to a characteristic diffusion length of ca. 10 μm for a 1 minute discharge.

The invention also provides a working electrode comprising a niobium molybdenum oxide. The working electrode is electrically conductive, and is electrically connectable to a counter electrode, for example within an electrochemical cell.

The working electrode may be an anode or cathode during a discharge step, for example in a lithium ion battery. Typically, the working electrode is the anode during a discharge step.

Typically, the working electrode for use in the method comprises a molar ratio of Nb$_2$O$_5$ to MoO$_3$ of from 6:1 to 1:3. Preferably, the molar ratio of Nb$_2$O$_5$ to MoO$_3$ in the working electrode is 1:3.

Typically, the working electrode for use in the method comprises a niobium molybdenum oxide selected from Nb$_2$Mo$_3$O$_{14}$, Nb$_{14}$Mo$_3$O$_{44}$ or Nb$_{12}$MoO$_{44}$. Preferably, the working electrode comprises Nb$_2$Mo$_3$O$_{14}$.

Typically, the working electrode does not have a porous nor hierarchical structure. The working electrode may have a specific surface area, pore volume and average pore size as described above.

Typically, the working electrode comprise a niobium molybdenum oxide in particulate form. The niobium molybdenum oxide particles of the working electrode may have a primary or agglomerate particle size as described above.

The working electrode may contain binders and adhesives as described above.

Electrochemical Cell

The present invention also provides an electrochemical cell comprising a working electrode of the invention. The working electrode may be an anode or cathode during a discharge step, for example in a lithium ion battery. Typically, the working electrode is the anode during a discharge step.

The electrochemical cell typically comprises a counter electrode and an electrolyte. The electrochemical cell may comprise a current collecting plate. The electrochemical cell may be in electrical connection with a power supply. The electrochemical cell may be in electrical connection with a measurement device, for example an ammeter or voltmeter.

The counter electrode may be an anode or cathode during a discharge step, for example in a lithium ion battery. The counter electrode is typically the cathode during a discharge step.

Suitable cathode materials include lithium-containing or lithium-intercalated material, such as a lithium metal oxide, wherein the metal is typically a transition metal such as Co, Fe, Ni, V or Mn, or combination thereof. Some examples of positive electrode materials include lithium cobalt oxide (LiCoO$_2$), lithium nickel manganese cobalt oxide (NMC, LiNiMnCoO$_2$, e.g. LiNi$_{0.6}$Co$_{0.2}$Mn$_{0.2}$O$_2$), lithium vanadium fluorophosphate (LiVPO$_4$F), lithium nickel cobalt aluminum oxide (NCA, LiNiCoAlO$_2$), lithium iron phosphate (LFP, LiFePO$_4$) and manganese-based spinels (e.g. LiMn$_2$O$_4$).

To improve conductivity at the counter electrode, a conductive carbon material (e.g., carbon black, graphite, nanoparticulate carbon powder or carbon nanotubes) is typically admixed with the counter electrode material. In one embodiment, the counter electrode comprises porous carbon, such as porous reduced graphene oxide.

In one embodiment, the counter electrode is substantially free of binders.

In an alternative embodiment, the counter electrode is admixed with a binder or adhesive. Some examples of binders or adhesives include PVDF, PTFE, CMC, PAA, PMMA, PEO, SBR and co-polymers thereof.

The counter electrode is typically fixed to a current collecting substrate, such as an aluminum plate.

Typically, the electrolyte in the electrochemical cell is suitable for solubilising lithium ions.

Typically, the electrolyte in a charged and discharged cell contains lithium ions. Typically, the electrolyte comprises lithium salts, such as LiTFSI, (bis(trifluoromethane)sulfonimide lithium salt, LiPF$_6$, LiBF$_4$, LiClO$_4$, LiTF (lithium triflate) or lithium bis(oxalato) borate (LiBOB).

The electrolyte may be a liquid electrolyte, such as a liquid at ambient temperature, for example at 25° C.

The electrolyte may be a non-aqueous electrolyte. The electrolyte may comprise a polar aprotic solvent. The electrolyte may comprise an organic solvent. Solvents for dissolving lithium ions are well known in the art.

Suitable solvents include carbonate solvents. For example propylene carbonate (PC), ethylene carbonate (EC), butylene carbonate (BC), chloroethylene carbonate, fluorocarbonate solvents (e.g., fluoroethylene carbonate and trifluoromethyl propylene carbonate), as well as the dialkylcarbonate solvents, such as dimethyl carbonate (DMC), diethyl carbonate (DEC), dipropyl carbonate (DPC), ethyl methyl carbonate (EMC), methyl propyl carbonate (MPC), and ethyl propyl carbonate (EPC).

Suitable solvents also include sulfone solvents. For example methyl sulfone, ethyl methyl sulfone, methyl phenyl sulfone, methyl isopropyl sulfone (MiPS), propyl sulfone, butyl sulfone, tetramethylene sulfone (sulfolane), phenyl vinyl sulfone, allyl methyl sulfone, methyl vinyl sulfone, divinyl sulfone (vinyl sulfone), di phenyl sulfone (phenyl sulfone), dibenzyl sulfone (benzyl sulfone), vinylene sulfone, butadiene sulfone, 4-methoxyphenyl methyl sulfone, 4-chlorophenyl methyl sulfone, 2-chlorophenyl methyl sulfone, 3,4-dichlorophenyl methyl sulfone, 4-(methylsulfonyl)toluene, 2-(methylsulfonyl) ethanol, 4-bromophenyl methyl sulfone, 2-bromophenyl methyl sulfone, 4-fluorophenyl methyl sulfone, 2-fluorophenyl methyl sulfone, 4-aminophenyl methyl sulfone, a sultone (e.g., 1,3-propanesultone), and sulfone solvents containing ether groups (e.g., 2-methoxyethyl(methyl)sulfone and 2-methoxyethoxyethyl(ethyl)sulfone).

Suitable solvents also include silicon-containing solvents such as a siloxane or silane. For example hexamethyldisiloxane (HMDS), 1,3-divinyltetramethyldisiloxane, the polysiloxanes, and polysiloxane-polyoxyalkylene derivatives. Some examples of silane solvents include methoxytrimethy lsilane, ethoxytrimethy lsilane, dimethoxydimethylsilane, methyltrimethoxysilane, and 2-(ethoxy)ethoxytrimethylsilane.

Typically, an additive may be included in the electrolyte to improve performance. For example vinylene carbonate (VC), vinyl ethylene carbonate, allyl ethyl carbonate, t-butylene carbonate, vinyl acetate, divinyl adipate, acrylic acid nitrile, 2-vinyl pyridine, maleic anhydride, methyl cinnamate, ethylene carbonate, halogenated ethylene carbonate, α-bromo-γ-butyrolactone, methyl chloroformate, 1,3-propanesultone, ethylene sulfite (ES), propylene sulfite (PS), vinyl ethylene sulfite (VES), fluoroethylene sulfite (FES), 12-crown-4 ether, carbon dioxide ($CO_2$), sulfur dioxide ($SO_2$), and sulfur trioxide ($SO_3$).

The electrochemical cell may also include a solid porous membrane positioned between the negative and positive electrodes. The solid porous membrane may partially or completely replace the liquid electrolyte. The solid porous membrane may comprise a polymer (e.g., polyethylene, polypropylene, or copolymer thereof) or an inorganic material, such as a transition metal oxide (e.g., titania, zirconia, yttria, hafnia, or niobia) or main group metal oxide, such as silicon oxide, which can be in the form of glass fiber.

The solid non-porous membrane may comprises a lithium-ion conductor. For example, LLZO (garnet family), LSPO (LISICON family), LGPS (thio-LISICON family), LATP/LAGP (NASICON family), LLTO (perovskite family) and phosphide/sulfide glass ceramics The electrochemical cell may be charged or discharged at a C-rate of at least 5C, such as the electrochemical cell may be charged or discharged at a C-rate of at least 5C with respect to one electron transfer per transition metal per formula unit of working electrode material. Preferably, the electrochemical cell may be charged or discharged at a C-rate of at least 10C, 15C, 20C, 25C, 30C, 35C, 40C, 50C, 60C or 80C.

The electrochemical cell may be charged or discharged at a current density of at least 750 $mA \cdot g^{-1}$. Preferably, the electrochemical cell may be charged or discharged at a current density of at least 800 $mA \cdot g^{-1}$, 850 $mA \cdot g^{-1}$, 900 $mA \cdot g^{-1}$, 950 $mA \cdot g^{-1}$, 1000 $mA \cdot g^{-1}$, 1050 $mA \cdot g^{-1}$, 1100 $mA \cdot g^{-1}$, 1200 $mA \cdot g^{-1}$ or 1300 $mA \cdot g^{-1}$.

The electrochemical cell may have a volumetric charge density of at least 200, 300, 400, 500, 600 or 700 $A \cdot h \cdot L^{-1}$ at 1C. Typically, the electrochemical cell has a volumetric charge density of up to 100, 200, 300 or 400 $A \cdot h \cdot L^{-1}$ at 20C.

The electrochemical cell may have a capacity retention of at least 70%, 75%, 80%, 85%, 90%, 95%, 96%, 97%, 98%, 99%, or 100% at 20C maintained over at least 50, 100, 150, 200, 250, 300, 400, 500, 600, 700, 800, 900, 1,000, 1,200, 1,500, 1,800, or 2,000 cycles.

The electrochemical cell may be regarded as fully charged when the voltage passes a threshold value. For example, an electrochemical cell comprising a lithium metal anode and a niobium tungsten oxide cathode may be regarded as fully charged when the voltage rises above a practicable level, such as where the voltage rises above 2.0 V against Li/Lit, such as above 2.25 V or above 2.5 V.

The electrochemical cell may be regarded as fully discharged when the voltage passes a threshold value. For example, an electrochemical cell comprising a lithium metal anode and a niobium tungsten oxide cathode may be regarded as fully discharged when the voltage drops below a practicable level, such as where the voltage drops below 1.5 V against Li/Lit, such as below 1.25 V or below 1.0 V.

The electrochemical cell may be a lithium ion cell.

Methods

The invention provides a method of charging and/or discharging an electrochemical cell at a C-rate of at least 5C, such as the electrochemical cell may be charged or discharged at a C-rate of at least 5C with respect to one electron transfer per transition metal per formula unit of working electrode material. The electrochemical cell comprises a working electrode comprising a niobium tungsten oxide and/or niobium molybdenum oxide. Preferably the electrochemical cell contains a counter electrode and an electrolyte.

Preferably the method is a method of charging and/or discharging an electrochemical cell at a C-rate of at least 10C, 15C, 20C, 25C, 30C, 35C, 40C, 50C, 60C or 80C.

The method may be a method of charging and/or discharging an electrochemical cell at a current density of at least 750 $mA \cdot g^{-1}$ such as at least 800 $mA \cdot g^{-1}$. Preferably the method is a method of charging and/or discharging an electrochemical cell at a current density of at least 800 $mA \cdot g^{-1}$, 850 $mA \cdot g^{-1}$, 900 $mA \cdot g^{-1}$, 950 $mA \cdot g^{-1}$, 1000 $mA \cdot g^{-1}$, 1050 $mA \cdot g^{-1}$, 1100 $mA \cdot g^{-1}$, 1200 $mA \cdot g^{-1}$ or 1300 $mA \cdot g^{-1}$.

The method may involve a cycle of charging and discharging or discharging and charging the electrochemical cell. The cycle may be repeated more than once. Thus, the method comprises 2 cycles or more, 5 cycles or more, 10 cycles or more, 50 cycles or more, 100 cycles or more, 500 cycles or more, 1,000 cycles or more, or 2,000 cycles or more.

Battery

The present invention also provides a battery comprising one or more electrochemical cells of the invention. The battery may be a lithium ion battery.

Where there are a plurality of cells, these may be provided in series or parallel.

A battery of the invention may be provided in a road vehicle, such as an automobile, moped or truck. Alternatively, a battery of the invention may be provided in a rail vehicle, such as a train or a tram. A battery of the invention may also be provided in an electric bicycle (e-bike).

A battery of the invention may be provided in a regenerative braking system.

A battery of the invention may be provided in a portable electronic device, such as a mobile phone, laptop or tablet.

A battery of the invention may be provided in a power grid management system.

Uses

The invention generally provides the use of a working electrode comprising a niobium tungsten oxide in a high-rate electrochemical cell, such as an electrochemical cell as described herein. Typically, the electrochemical cell may be charged or discharged at a C-rate of at least 5C, such as the electrochemical cell may be charged or discharged at a C-rate of at least 5C with respect to one electron transfer per transition metal per formula unit of working electrode material. Preferably, the electrochemical cell may be charged or discharged at a C-rate of at least 10C, 15C, 20C, 25C, 30C, 35C, 40C, 50C, 60C or 80C.

The electrochemical cell may be charged or discharged at a current density of at least 750 $mA \cdot g^{-1}$. Preferably, the electrochemical cell may be charged or discharged at a current density of at least 800 $mA \cdot g^{-1}$, 850 $mA \cdot g^{-1}$, 900 $mA \cdot g^{-1}$, 950 $mA \cdot g^{-1}$, 1000 $mA \cdot g^{-1}$, 1050 $mA \cdot g^{-1}$, 1100 $mA \cdot g^{-1}$, 1200 $mA \cdot g^{-1}$ or 1300 $mA \cdot g^{-1}$.

The working electrode may find use in the methods described herein.

Other Preferences

Each and every compatible combination of the embodiments described above is explicitly disclosed herein, as if each and every combination was individually and explicitly recited.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

Certain aspects and embodiments of the invention will now be illustrated by way of example and with reference to the figures described above.

Experimental

The following examples are provided solely to illustrate the present invention and are not intended to limit the scope of the invention, as described herein.

Synthesis of $Nb_{16}W_5O_{55}$ and $Nb_{18}W_{16}O_{93}$ $Nb_{16}W_5O_{55}$ and $Nb_{18}W_{16}O_{93}$ were synthesized by co-thermal oxidation of dark blue $NbO_2$ (Alfa Aesar, 99+%) and brown $WO_2$ (Alfa Aesar, 99.9%) in approximately one to five gram batches. The partially reduced oxides were massed to within 0.001 g of the 16:5 or 18:16 mole ratios, ground together by hand with an agate mortar and pestle, pressed into a pellet at 10 MPa, and heated in a platinum crucible at a rate of 10 K·min$^{-1}$ to 1473 K, and naturally cooled in the furnace over ca. 2 h.

Synthesis of $Nb_8W_9O_{47}$ and $Nb_{12}WO_{33}$ $Nb_8W_9O_{47}$ and $Nb_{12}WO_{33}$ were synthesized by co-thermal oxidation of dark blue $NbO_2$ (Alfa Aesar, 99+%) and brown $WO_2$ (Alfa Aesar, 99.9%) in approximately one to five gram batches. The partially reduced oxides were massed to within 0.001 g of the 8:9 or 12:1 ml ratios, ground together by hand with an agate mortar and pestle, pressed into a pellet at 10 MPa, and heated in a platinum crucible at a rate of 10 K·min$^{-1}$ to 1473 K, and naturally cooled in the furnace over ca. 2 h.

Synthesis of $Nb_2Mo_3O_{14}$ $Nb_2Mo_3O_{14}$ synthesized by co-thermal oxidation of dark blue $NbO_2$ (Alfa Aesar, 99+%) and dark brown $MoO_2$ (Sigma, 99%), or co-thermal oxidation of white $Nb_2O_5$ (Sigma, 99.9985%) and off-white $MoO_3$ (Sigma, ≥99.5%), in approximately one to five gram batches. The partially reduced oxides were massed to within 0.001 g of the 2:3 or 1:3 molar ratio, ground together by hand with an agate mortar and pestle, pressed into a pellet at 10 MPa, and heated in a platinum or alumina crucible at a rate of 10 K·min$^{-1}$ to 873 K, 923 K or 973 K, and quenched in air outside the furnace on a metal plate.

Microscopic Characterisation

Scanning electron microscopy (SEM) images were taken with a Zigma VP instrument (Zeiss) at 3.0 KV and a MIRA3 instrument (TESCAN) at 5.0 kV with secondary electron detection. Tap density was recorded on an AutoTap (Quantachrome Instruments) instrument operating at 257 taps·min$^{-1}$. Tap densities were measured according to ASTM international standard B527-15 modified to accommodate a 5 to 10 cm$^3$ graduated cylinder.

Figure 1B:
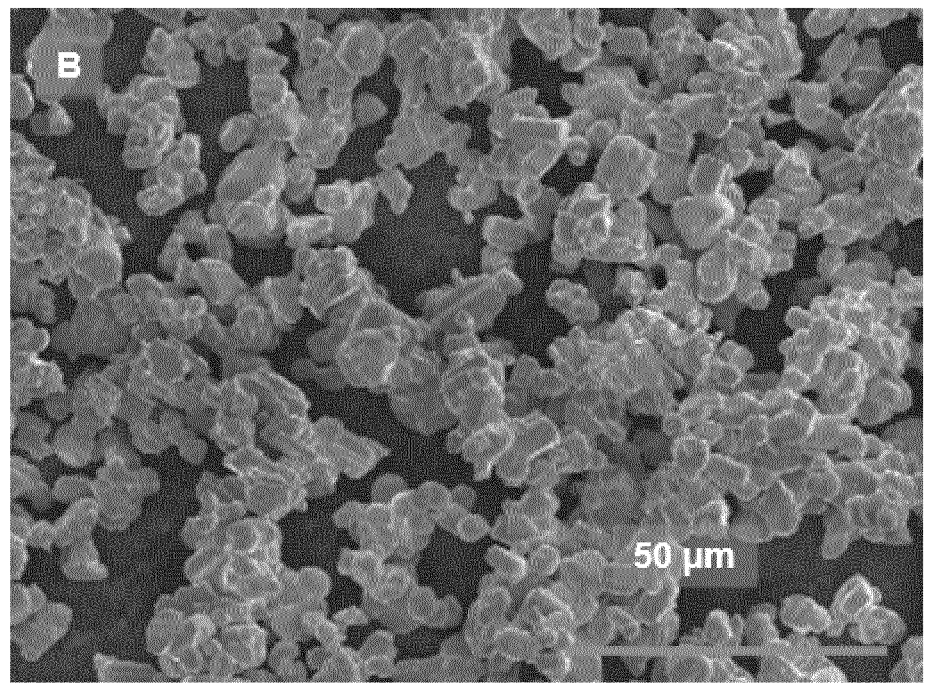
Figure 2:
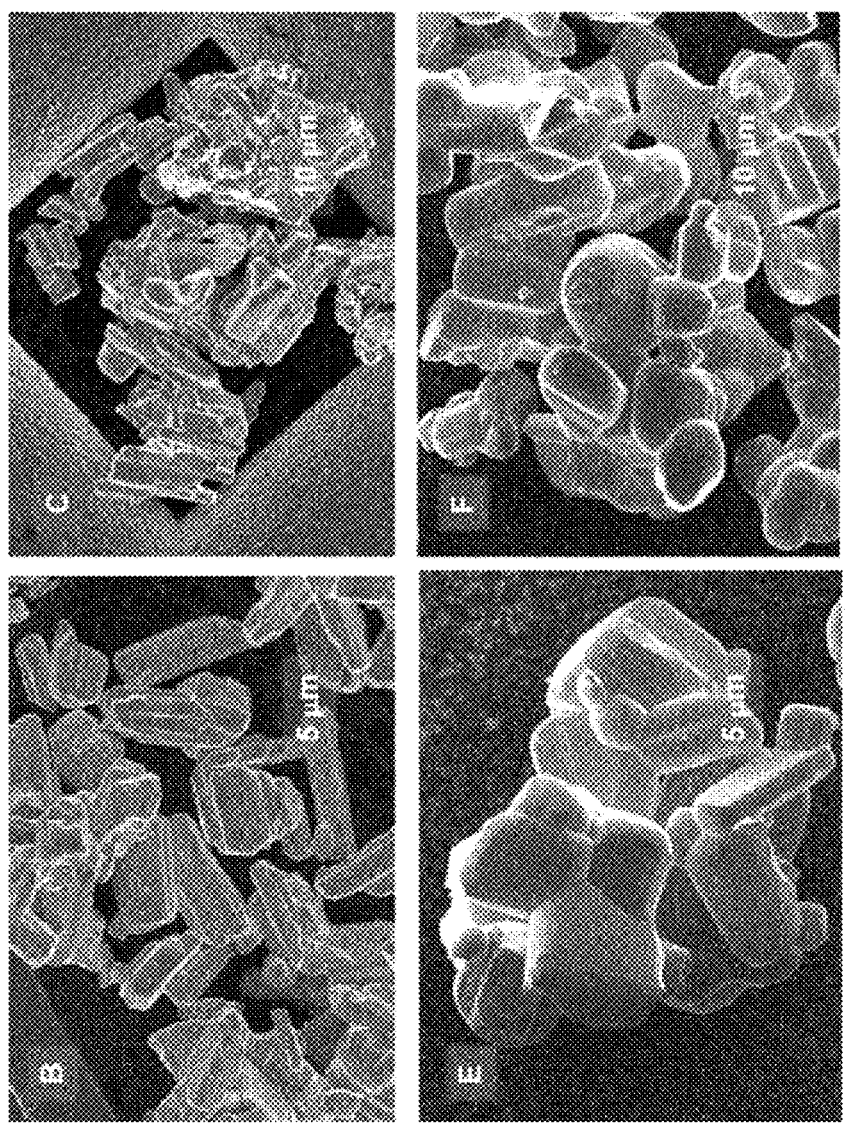
FIG. 2 is an atomic structure and SEM image showing (A-C) $Nb_{16}W_5O_{55}$ and (D-F) $Nb_{18}W_{16}O_{93}$. The scale bars shown in (B) and (E) are 5 μm. The scale bars shown in (C) and (F) are 10 μm.
Figure 2:
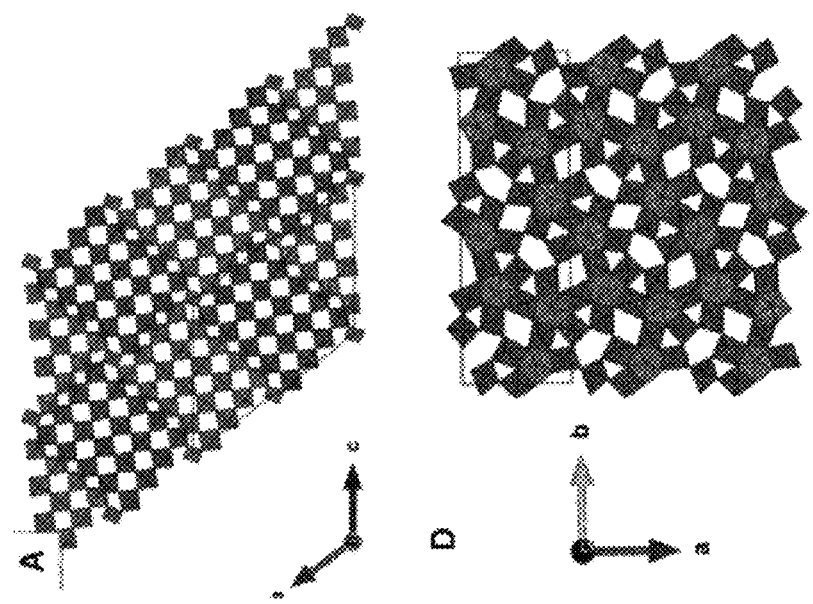

Both $Nb_{16}W_5O_{55}$ and $Nb_{18}W_{16}O_{93}$ formed subhedral particles with ca. 3 to 10 μm primary particles that appeared in the electron microscope to be intergrown/'cemented' into larger secondary particles of ca. 10 to 30 μm (FIGS. 1 and 2). The bulk compounds are a series of complex "block" ($Nb_{16}W_5O_{55}$) or "bronze-like" ($Nb_{18}W_{16}O_{93}$) oxide structures (FIG. 2) largely comprised of corner and edge sharing $NbO_6$ and $WO_6$ octahedra.

$Nb_{16}W_5O_{55}$ has a monoclinic structure comprised of subunits of corner-shared octahedra arranged into $ReO_3$-like blocks, four octahedra wide by five octahedra long, and infinite in the third dimension (FIG. 2A). The block subunits are connected by crystallographic shear planes along the edges and by tetrahedra at each corner leading to the notation $(4×5)_1$ where, in $(m×n)_p$, m and n denote block length in units of octahedra and p relates to the connectivity of the blocks which may also be joined in pairs (p=2) or infinite ribbons (p=∞).

Figure 3:
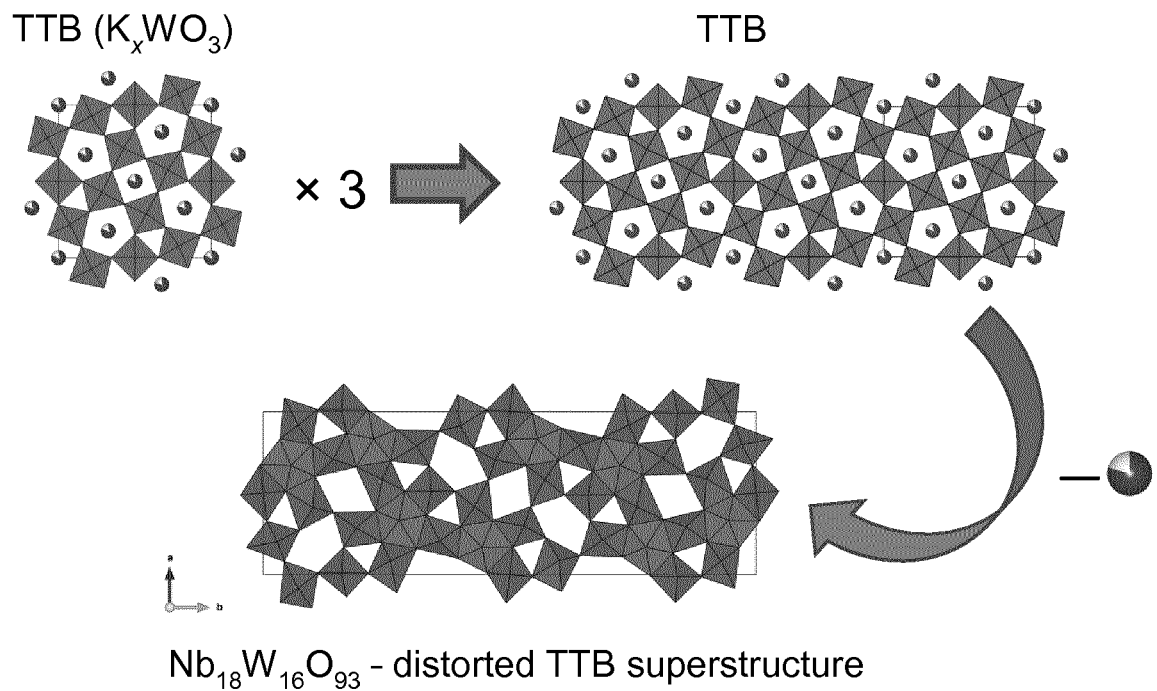
FIG. 3 is a diagram showing the bronze-like structure of $Nb_{18}W_{16}O_{93}$ and its relationship to the classic tetragonal tungsten bronze (TTB). Partially filled spheres represent $K^+$ ions, which are not present in $Nb_{18}W_{16}O_{93}$

$Nb_{18}W_{16}O_{93}$ is orthorhombic, a 1×3×1 superstructure of the classic tetragonal tungsten bronze (TTB) (FIGS. 2D and 3). The TTB structure is sometimes stabilized by cations (e.g. K+, partially filled spheres in FIG. 3); alkali cation-free $Nb_{18}W_{16}O_{93}$ is stabilized by -M-O-chains partially occupying the tunnels and forming pentagonal bipyramids. The ionic and electronic implications for lithium intercalation, respectively, are that the layers of $Nb_{18}W_{16}O_{93}$ are still fully open and unoccupied by cations (i.e., around the plane (x, y, ½)) and all metal cations are in the desired d$^0$ electron configuration while in classic TTB structure neither of these criteria is met.

Electrochemical Characterization of $Nb_{16}W_5O_{55}$ and $Nb_{18}W_{16}O_{93}$ Electrochemical characterisation was conducted using a stainless steel 2032-coin cell (Cambridge Energy Solutions) with a conical spring, two 0.5 mm stainless steel spacer disks, a plastic gasket, and a glass microfiber separator (Whatman). To form the niobium tungsten oxide electrode, the niobium tungsten oxide and conductive carbon (Super P, TIMCAL) were ground by hand in an agate mortar and pestle in an 8:1 mass ratio. This powder was ground in a 9:1 mass ratio with poly(vinylidene difluoride) (PVDF, Kynar) dispersed in N-methyl pyrrolidone (NMP, Sigma-Aldrich, anhydrous, 99.5%). The slurry was coated onto aluminium or copper foil with a doctor blade (bar coater). The NMP was removed by heating in an oven at 60° C. for 24 hours. Though standard, Super P carbon is a nanoparticulate powder and NMP is a hazardous organic solvent so appropriate nanoparticle cabinets/fume hoods should be used.

This 80/10/10 metal oxide/carbon/polymer electrode served as the cathode against a Li metal disk (LTS Research, 99.95%) anode in a half-cell geometry. In the electrochemical tests, the electrolyte was 1 M LiPF$_6$ dissolved in 1:1 v/v ethylene carbonate/dimethyl carbonate (EC/DMC; Sigma-Aldrich, battery grade; also known as LP30). No additives were used. Electrochemistry was performed in a temperature-controlled room at 293 K. A Biologic galvanostat/potentiostat with EC-Lab software was used to perform the electrochemical measurements.

Dense electrodes of large particles with 2 to 3 mg·cm$^{-2}$ active mass loading were tested at current densities corresponding to discharge times of several hours to tens of seconds. $Nb_{16}W_5O_{55}$ was charged with a 1 h constant voltage step at the top of charge to ensure a comparable starting point on discharge; $Nb_{18}W_{16}O_{93}$ was cycled without this step and stored over 100 mA·h·g$^{-1}$ at 60C (i.e., in <60 s). High-rate cycling for 1000 cycles was performed on both oxides at 10C/20C constant current without any potentiostatic step.

Figure 4A:
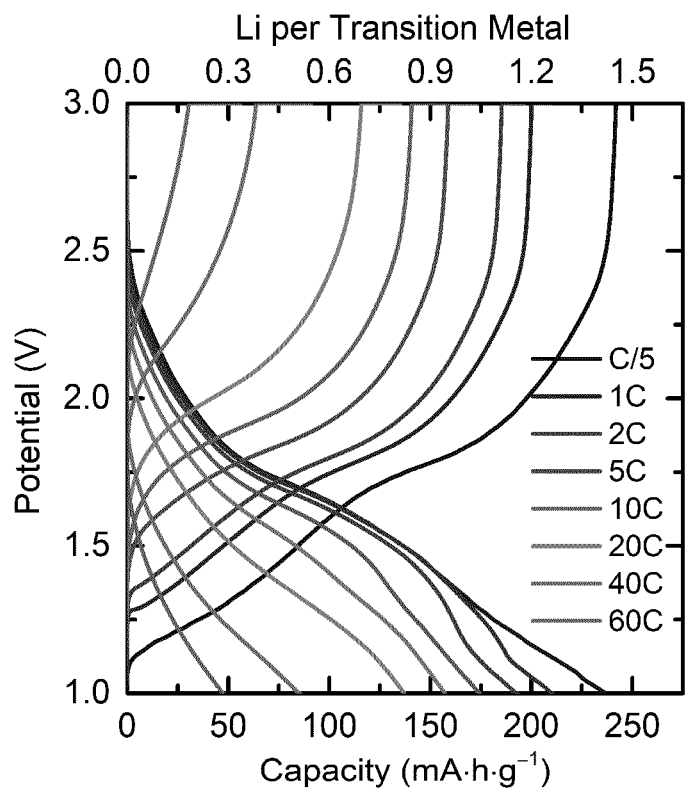
FIG. 4 is a diagram showing the rate performance of bulk $Nb_{16}W_5O_{55}$ and $Nb_{18}W_{16}O_{93}$. (A) galvanostatic discharge and charge curves for $Nb_{16}W_5O_{55}$ from 60C (leftmost curve at 1.0 V and 3.0 V) to 0.2C (rightmost curve at 1.0 V and 3.0 V); (B) dQ/dV plot for $Nb_{16}W_5O_{55}$ from 0.2C (leftmost curve at 50 $mA \cdot h \cdot g^{-1}$) to 60C (rightmost curve at 50 $mA \cdot h \cdot g^{-1}$); (C) galvanostatic discharge and charge curves for $Nb_{18}W_{16}O_{93}$ from 100C (leftmost curve at 1.0 V and 3.0 V) to 0.2C (rightmost curve at 1.0 V and 3.0 V); (D) dQ/dV plot for $Nb_{18}W_{16}O_{93}$ from 0.2C (leftmost curve at 50 $mA \cdot h \cdot g^{-1}$) to 100C (rightmost curve at 50 $mA \cdot h \cdot g^{-1}$); (E) a summary of the rate performance and (F) high-rate cycling of 250 cycles at 10C followed by 750 cycles at 20C.
Figure 4B:
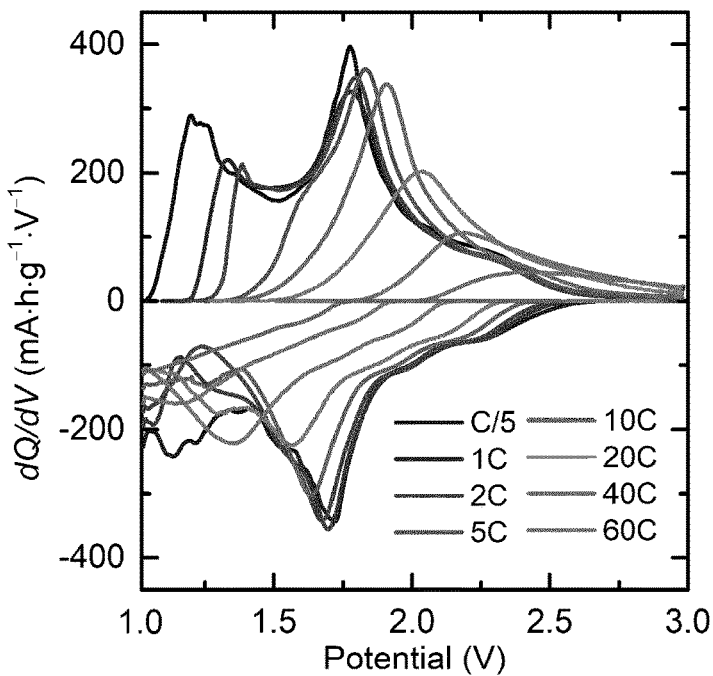
Figure 4C:
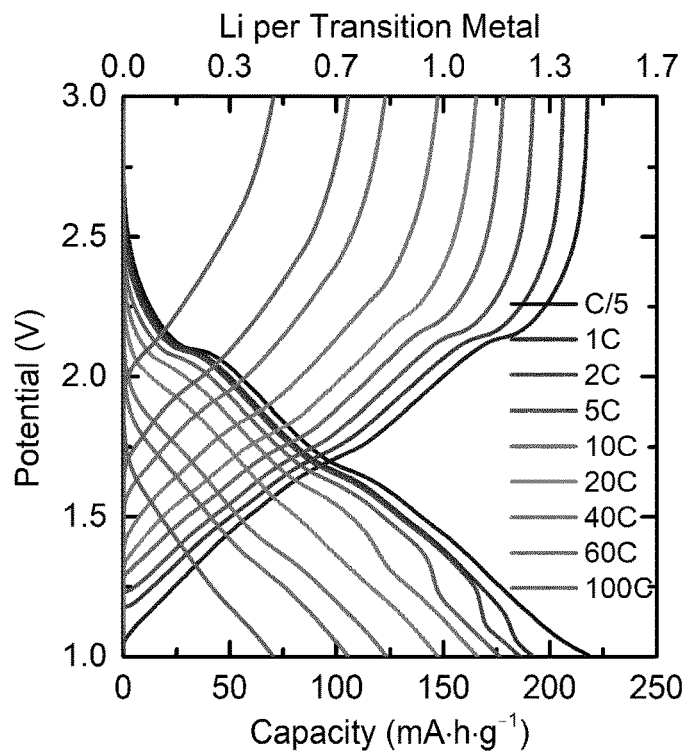

Reaction of $Nb_{16}W_5O_{55}$ with lithium (FIG. 4A) proceeds in three regions from 2.5 V to 1.0 V, with an average voltage of 1.57 V (FIG. 5), comparable to the average voltage of $Li_4Ti_5O_{12}$ of 1.55 V. The three regions, more easily observed in the derivative plot (FIG. 4B), are characterized by their slope and are reminiscent of the three regions observed in other crystallographic shear structures (e.g., H—$Nb_2O_5$, PNb$_9$O$_{25}$, TiNb$_2$O$_7$, and Nb$_{12}$WO$_{33}$). When the kinetics were examined over a range of current densities from C/5 (34.3 mA·g$^{-1}$) up to 60C (10.3 A·g$^{-1}$), Nb$_{16}$W$_5$O$_{55}$ showed unprecedented bulk rate performance (FIGS. 4A and 4C). At C/5, around 1.3 lithium ions can be reversibly intercalated per transition metal for a gravimetric capacity of ca. 225 mA·h·g$^{-1}$. When the rate is increased by a factor of 25 to 5C, Nb$_{16}$W$_5$O$_{55}$ maintains a capacity of 1.0 Li$^+$/TM (171 mA·h·g$^{-1}$). At 20C, which corresponds to a three minute discharge, it is still possible to exchange 0.86 Li/TM and access 148 mA·h·g$^{-1}$. Rate tests on Nb$_{16}$W$_5$O$_{55}$ were measured with a potentiostatic hold at the top of charge to ensure a reliable starting point for discharge. To test the performance under more demanding conditions, 1000 cycles were measured with fixed galvanostatic discharge and charge conditions of 10C for 250 cycles followed by 20C for 750 cycles with no hold (FIG. 4F). Under these conditions, 0.90 Li$^+$/TM (avg. 155 mA·h·g$^{-1}$) were reversibly intercalated at 10C with 95% capacity retention after 250 cycles on non-optimized or calendared electrodes. At 20C, the capacity was 0.75 Li$^+$/TM (avg. 128 mA·h·g$^{-1}$); the capacity retention was again 95% over the 750 cycles at 20C.

Figure 4D:
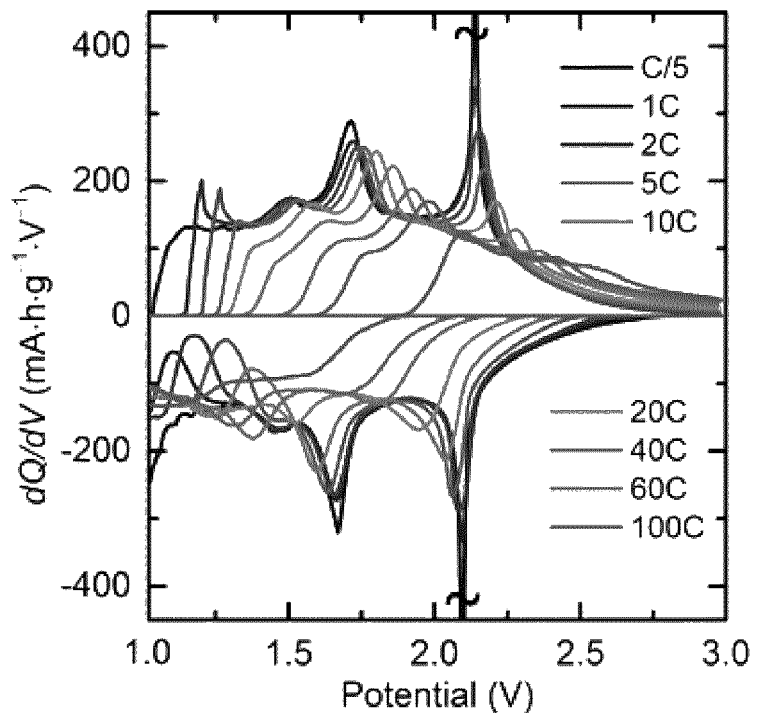
Figure 4E:
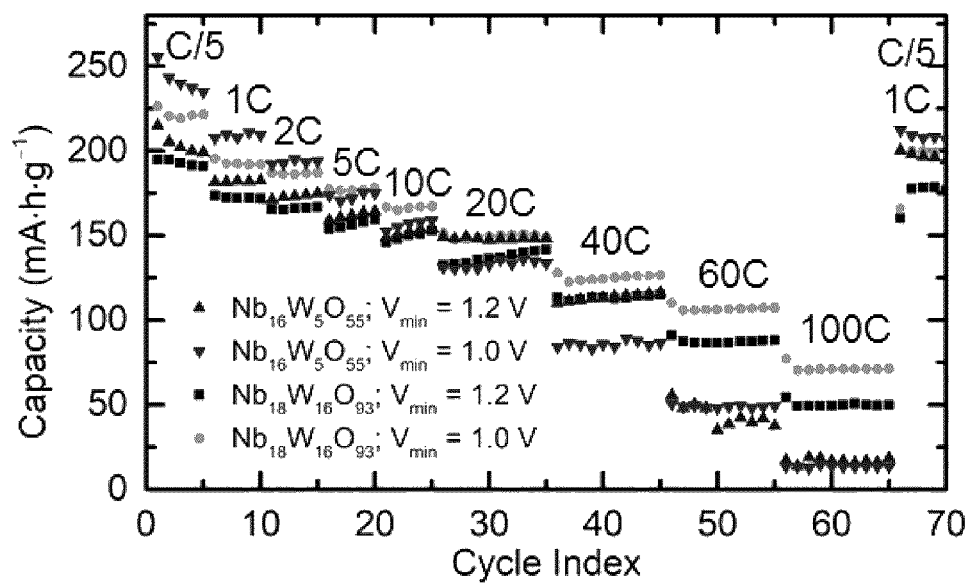
Figure 4F:
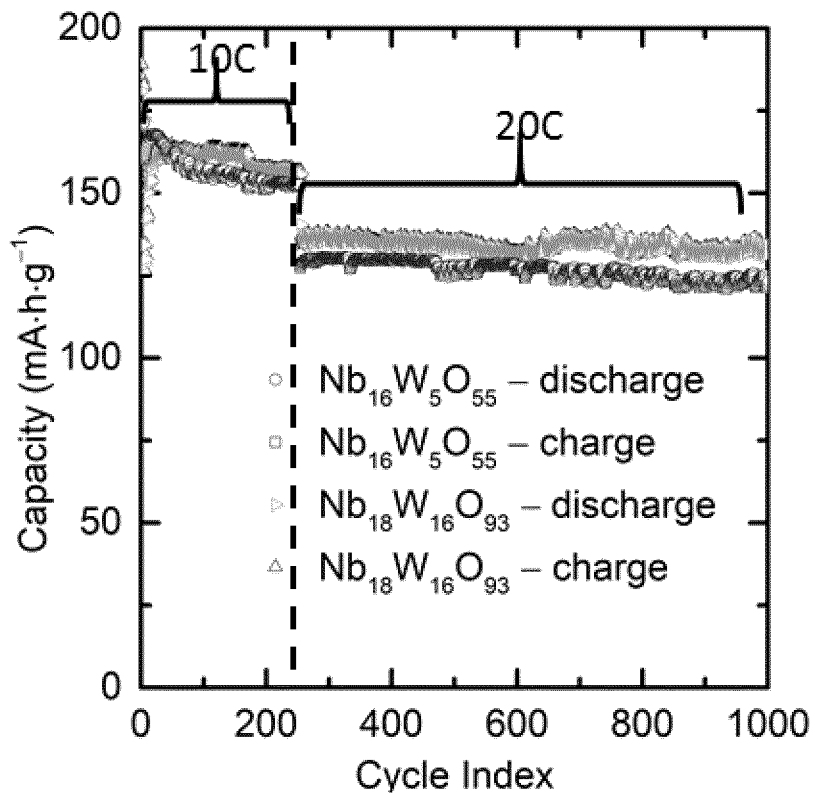

The average voltage of Nb$_{18}$W$_{16}$O$_{93}$ is 1.67 V (FIG. 4D-F). In terms of gravimetric capacity, Nb$_{18}$W$_{16}$O$_{93}$ stores ca. 20 mA·h·g$^{-1}$ less than Nb$_{16}$W$_5$O$_{55}$ at C/5 and 1C due to the higher molar mass of the tungsten-rich bronze phase. However, at 20 C, Nb$_{18}$W$_{16}$O$_{93}$ is still able to accommodate a full unit Li$^+$/TM for a capacity of ca. 150 mA·h·g$^{-1}$. At 60C and 100C (14.9 A·g$^{-1}$), the capacity is still 105 and 70 mA·h·g$^{-1}$, respectively.

Comparison of Cu Foil to Carbon-Coated Al Foil Current Collector

FIG. 6 shows the effect of current collectors, which cannot be ignored at high rates.

Figure 6A:
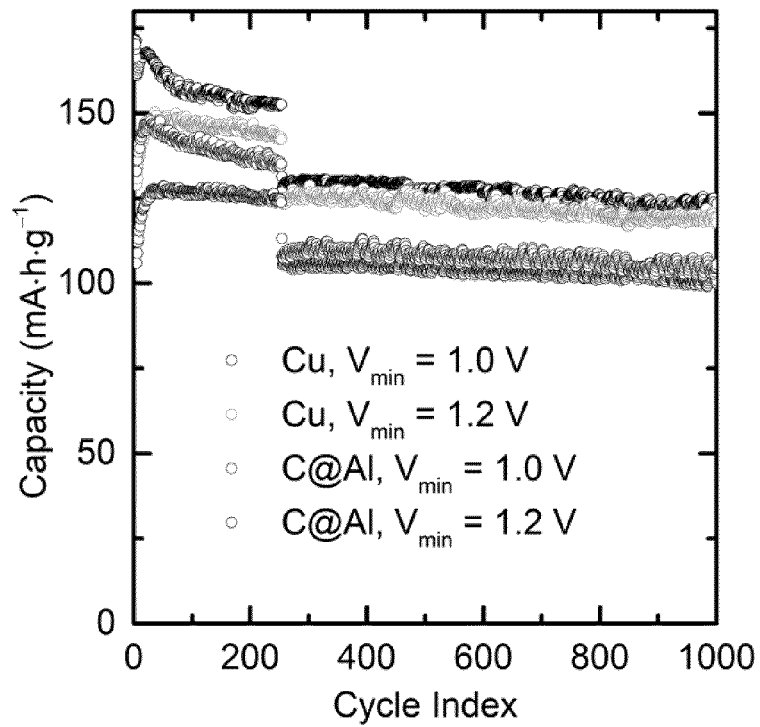
FIG. 6A shows $Nb_{16}W_5O_{55}$ cycled for 1000 cycles under constant current discharge and charge at 10C (first 200 cycles) and 20C (last 800 cycles); Cu foil at 1.0 V (topmost line); Cu foil at 1.2 V (second from top); C—Al at 1.0 V (third from top) and C—Al at 1.2V (bottommost line).
Figure 6B:
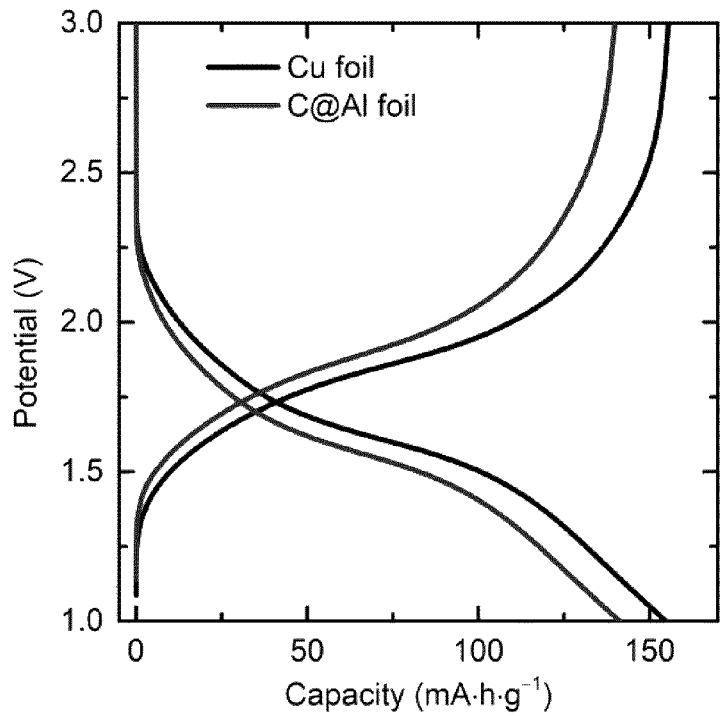
FIG. 6B shows discharge and charge profiles between 3.0 and 1.0 V for the 100th cycle at 10C; order of curves at 100 $mA \cdot h \cdot g^{-1}$: C—Al charging curve (topmost); Cu foil charging curve (second from top); Cu foil discharging curve (third from top) and C-Al discharging curve (bottommost).

For Nb$_{16}$W$_5$O$_{55}$ cycled for 1000 cycles under constant current discharge and charge at 10C/20C, Cu foil current collector displayed moderately higher capacity than carbon-coated Al (C@Al) foil (FIG. 6A). Untreated Al foil has been shown to be insufficient for high current densities (Griffith et al.); C@Al demonstrated significant improvement over untreated Al. In Nb$_{16}$W$_5$O$_{55}$, the lower voltage region is the source of excess capacity beyond 1.0 Li$^+$/TM at low rates but is effectively shifted below 1.0 V at moderate rates. The second discharge peak (centered at 1.2 V) is only observed at C/5 in the dQ/dV plot (FIG. 4B). As a result, the capacity observed when cycling with a minimum voltage limit of 1.2 V vs. 1.0 V becomes less significant as rate increases and safety may be further improved by avoiding lower voltages. FIG. 6B shows discharge and charge profiles between 3.0 and 1.0 V for the 100th cycle at 10C.

Longer Term Cycling as a Function of Minimum Cutoff Voltage

FIG. 7 shows the effect of long term cycling at C/5.

Figure 7A:
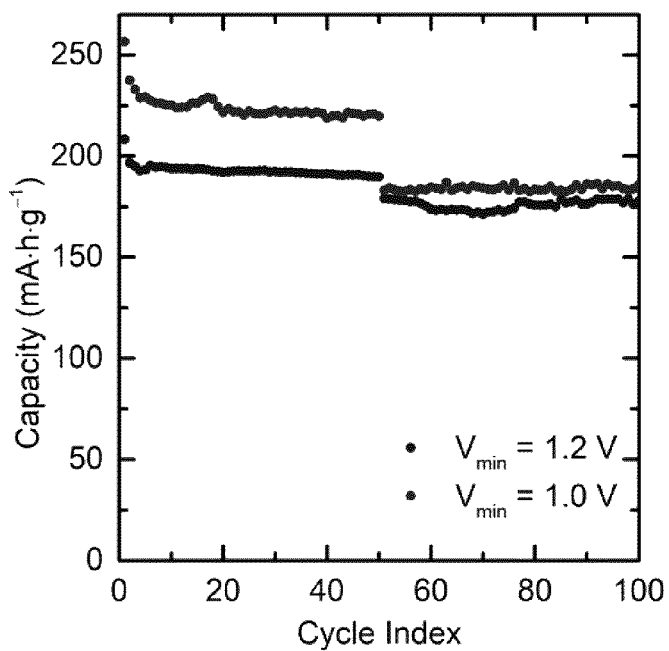
FIG. 7 shows longer term cycling as a function of minimum cutoff voltage. (A) $Nb_{16}W_5O_{55}$ cycled at C/5 (first 50 cycles) and 1C (second 50 cycles) on Cu foil with a 1 h potentiostatic hold at the top of charge; $V_{min}$=1.2 V (topmost curve); $V_{min}$=1.0 V (bottommost curve). (B) $Nb_{16}W_5O_{55}$ cycled at C/5 on Al foil without a potentiostatic charging step.
Figure 7B:
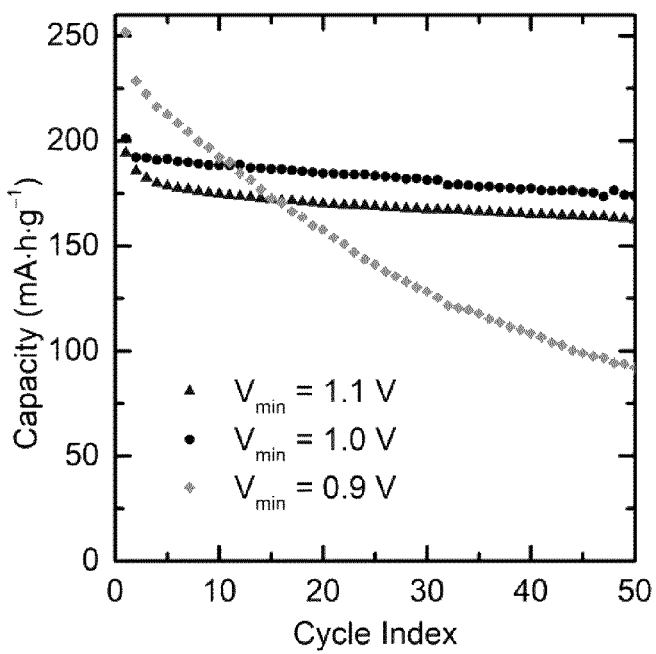

Constant current constant voltage charging is a common method to maximize capacity without overcharging, as in (FIG. 7A), but the extra time required means that the cycling could be considered C/5 and 1C discharge but C/6 and C/2 charge. The 2nd to 50th cycle retention in FIG. 7A is 96% and 93% for a voltage minimum of 1.2 and 1.0 V, respectively. The 51st to 100th cycles at 1C show capacity retentions of 99% and 101% for 1.2 and 1.0 V, respectively. Cycle retention for the 2nd to 50th cycles for C/5 in FIG. 7B is 88%, 90%, and 40% for 1.1, 1.0, and 0.9 V, respectively. Cycling time was approximately one month.

Overpotential in a Li∥Li Symmetric Cell as a Function of Current Density

Figure 8:
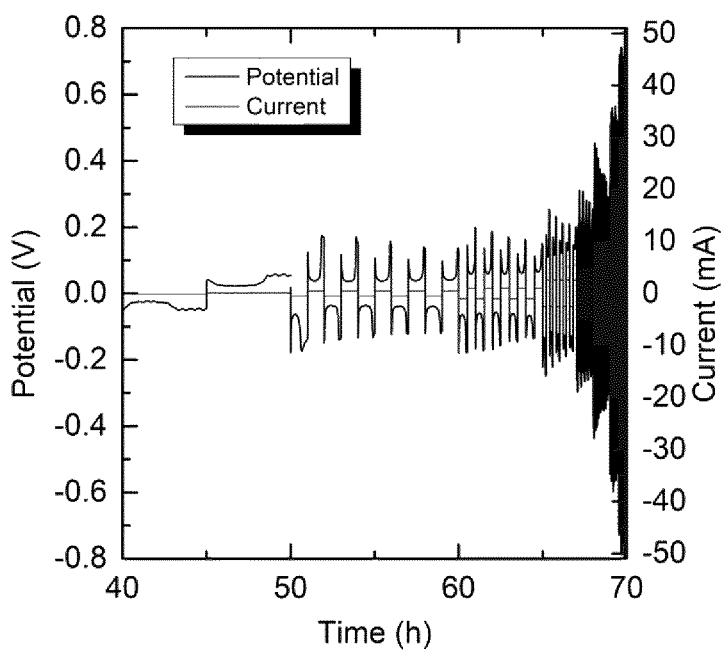
FIG. 8 shows overpotential in a Li∥Li symmetric cell as a function of current density.

As a control, Li∥Li symmetric cells were cycled at current densities corresponding to those in FIG. 4A-E (FIG. 8). Cells were configured identically to those used for metal oxide testing with the exception of a second Li disk replacing the composite electrode. Rate testing was carried out with 5 cycles at 100 µA (C/5), 500 µA (1C), 1 mA (2C), 2.5 mA (5C), 5 mA (10C) and 10 cycles at 10 mA (20C), 20 mA (40C), 30 mA (60C), and 50 mA (100C). The "rate" in parentheses indicates the inverse of the amount of time in hours that current was applied, simulating the rate test. At low current densities, below 1 mA (2C), the overpotential is below 100 mV; however, at 5 mA (10C) it rises to 200 mV and increases to ca. 700 mV at 100C.

The overpotentials in the symmetric cell (FIG. 8) closely match those observed in the electrochemical cycling curves of FIGS. 4A and 4D. This suggests that the extremely high rates for a bulk electrode are approaching the limits of Li metal plating/stripping and/or lithium ion desolvation and transport in carbonate ester electrolytes at room temperature, i.e., a significant fraction of the ohmic drop seen during fast charging results from the Li metal and not the complex oxide electrode materials.

$^7$Li Pulsed Field Gradient NMR Spectroscopy $^7$Li NMR diffusion spectra were recorded on a Bruker Avance III 300 MHz spectrometer using a Diff50 probehead equipped with an extended variable temperature capabilities. Spectra were recorded with the stimulated echo pulsed field gradient (PFG) sequence shown in FIG. 9 to minimize spin-spin relaxation (T$_2$) losses. After the first 90° radiofrequency (rf) pulse, the net magnetization loses coherence due to T$_2$ relaxation; thus, the time period following this pulse, which includes the first PFG pulse (to encode spin position), must be shorter than T$_2$. In the stimulated echo sequence used here, a second 90° rf pulse is applied which stores the net magnetization along the z axis prior to the diffusion time, Δ, allowing the observed species to diffuse for a time commensurate with the comparatively longer spin-lattice (T$_1$) value, as no T$_2$ relaxation occurs. During Δ, a short spoiler gradient (SINE. 100) is applied to remove residual transverse magnetization. Afterwards, a third 90° rf pulse is applied, followed by a PFG pulse to decode spin position. Sufficiently long delays between PFG and radiofrequency pulses were used (≥0.5 ms) to minimize eddy currents in the diffusion measurements.

Figure 9:
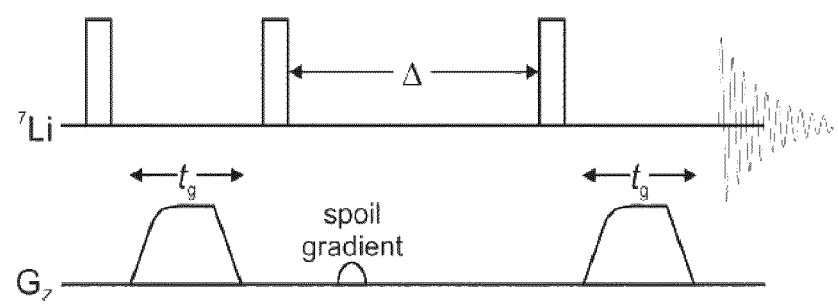
FIG. 9 shows the stimulated echo pulsed field gradient sequence used to measure 7Li diffusivities showing both radiofrequency ($^7Li$) and magnetic field gradient ($G_z$) pulses. Here, gradient pulse duration ($t_g$) includes the up ramp, time on, and down ramp of the opt composite gradient pulses.
Figure 10A:
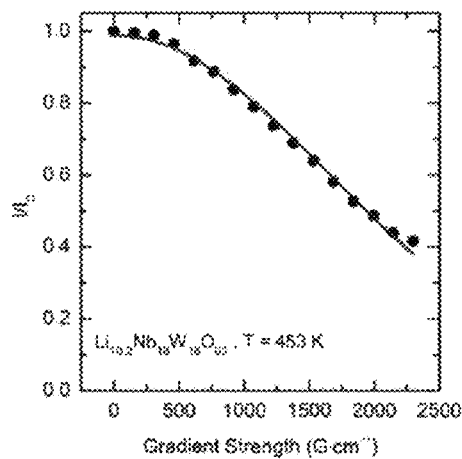
FIG. 10 shows representative 7Li decay curves showing normalized NMR signal intensity as a function of gradient strength for (A) $Li_{10.2}Nb_{18}W_{16}O_{93}$ at 453 K, (B) $Li_{6.8}Nb_{18}W_{16}O_{93}$ at 453 K, (C) $Li_{3.4}Nb_{18}W_{16}O_{93}$ at 453 K, (D) $Li_{6.3}Nb_{16}W_5O_{55}$ at 353 K, and (E) $Li_{8.4}Nb_{16}W_5O_{55}$ at 383 K. Black circles represent experimental data points and red lines represent (A-C; E) mono- or (D) biexponential fits of the data to the Stejskal-Tanner equation.
Figure 10B:
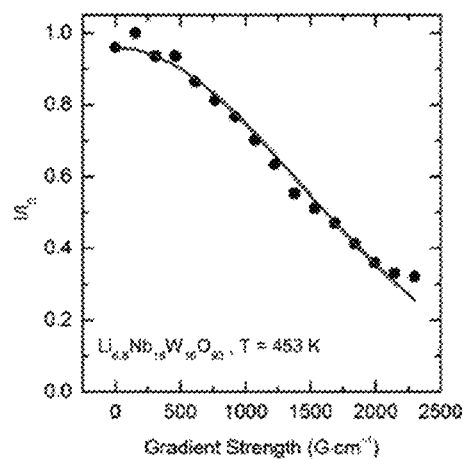
Figure 10C:
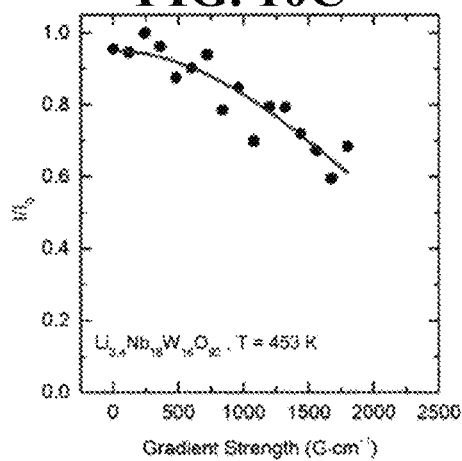
Figure 10D:
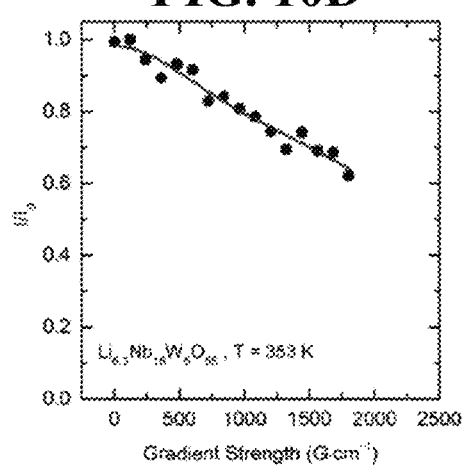
Figure 10E:
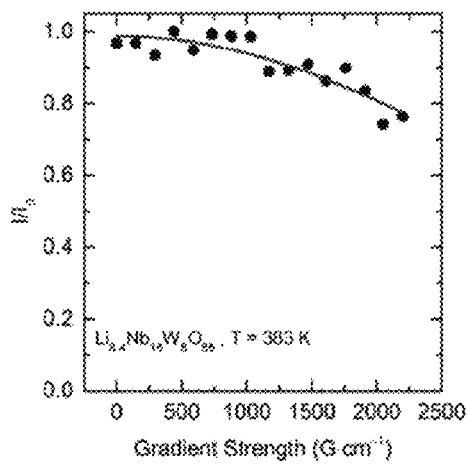

During this sequence, the gradient strength, g, was varied from 0.87 to 1800 or 2300 G·cm$^{-1}$, and 16 gradient steps were acquired using 'opt' shaped pulses with 1024-4096 transients. The opt shape is a composite pulse that starts with a quarter of a sine wave, followed by a constant gradient, and ends with a ramp down (FIG. 9). The 'opt' gradient pulses provide the largest gradient integral for a given time period, maximizing the range of diffusion coefficients we could assess in this experiment.

Spectra were analysed in phase-sensitive mode and the response of the NMR signal intensity, I, to variation in g, is described by the Stejskal-Tanner equation:

$$\frac{I}{I_0} = \exp\left(-g^2\gamma^2\delta^2\left(\Delta - \frac{\delta}{3}\right)\cdot D\right)$$

where I$_0$ is the intensity in the absence of gradients, γ is the gyromagnetic ratio ($\gamma_{7Li}$=103.962×10$^6$·s$^{-1}$·T$^{-1}$), δ is the effective gradient pulse duration, and D is the diffusion coefficient. Here, NMR signal intensity and integral gave similar $^7$Li diffusivities, but NMR signal intensities gave more reliable data, as evaluated by the standard deviation of the fit. Typical δ values ranged from 0.8 ms to 1.5 ms and Δ values ranged from 50-100 ms for the bronze and the block phase samples, respectively.

Diffusion spectra were recorded at elevated temperatures (333-453 K) due to the increase in $T_2$ observed at high temperature (e.g. $T_2$ for $Li_{3.4}Nb_{18}W_{16}O_{93}$ is approximately 700 μs at room temperature vs. 1.9 ms at 453 K). (N.b. No attempt was made to calibrate the temperature for this experimental setup because a single-tuned $^7$Li coil was used and no reliable $^7$Li reference is routinely used for temperature calibration. The Bruker manual states that for static measurements, the temperature calibration should be within ±7 degrees of the set value.) The increase in $T_2$ allowed the use of longer gradient pulses, δ, that were necessary to measure diffusion coefficients in the solid oxides.

Representative $^7$Li diffusion decay curves are shown in FIG. 10. The data quality is directly correlated with the Li content and subsequent signal-to-noise ratio (SNR) of the 7Li NMR spectra, where SNRs of 95, 56, 10, and 12 were observed for FIG. 10A ($Li_{10.2}Nb_{18}W_{16}O_{93}$), 10B ($Li_{6.8}Nb_{18}W_{16}O_{93}$), 10C ($Li_{3.4}Nb_{18}W_{16}O_{93}$), and 10D ($Li_{6.3}Nb_{16}W_5O_{55}$), respectively. We note that while the SNR of the low Li content $Li_{3.4}Nb_{18}W_{16}O_{93}$ sample is low and the signal decay is only ca. 60%, the observed trend in 7Li diffusivity and activation energy is consistent with that observed in more lithiated bronze structures.

Figure 11:
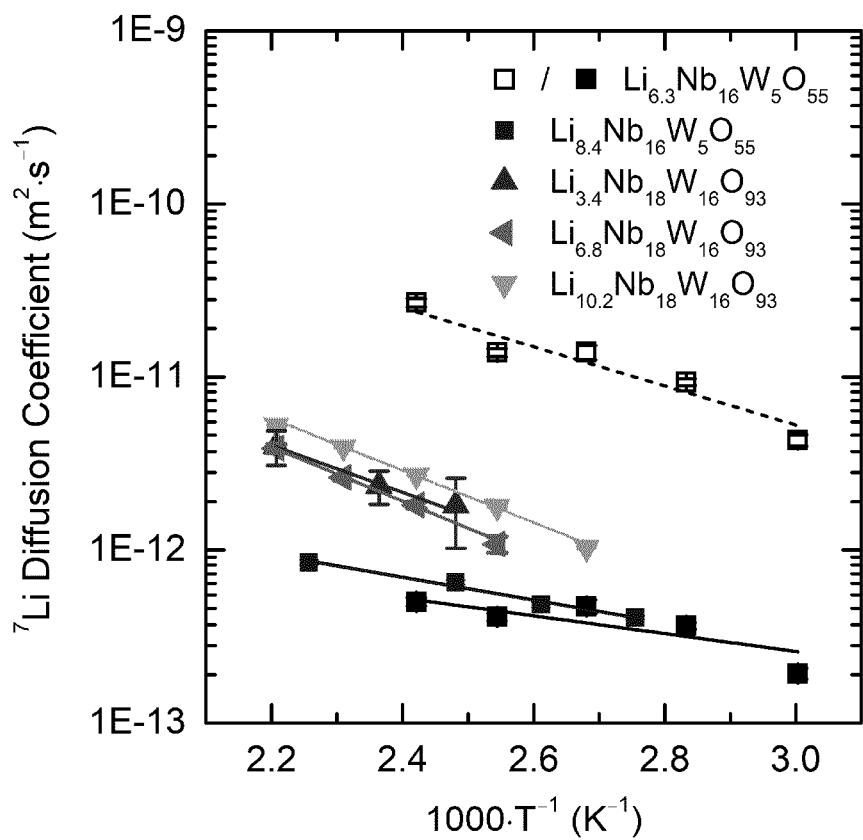
FIG. 11 shows lithium diffusion measured via 7Li pulsed field gradient nuclear magnetic resonance (PFG NMR) spectroscopy. The lithium diffusion coefficients of $Li_{6.3}Nb_{16}W_5O_{55}$ and $Li_xNb_{18}W_{16}O_{93}$ (x=3.4, 6.8, 10.2) were measured in the temperature range 333-453 K. The filled (85% signal contribution) and empty (15% signal contribution) symbols for $Li_{6.3}$ $Nb_{16}W$ 5055 correspond to the observed two-component diffusion.

$Li_{6.3}Nb_{16}W_5O_{55}$ shows two-component behavior with lithium transport as rapid as $4.3 \times 10^{-12}$ m$^2 \cdot$s$^{-1}$ at 333 K (FIG. 11). Assuming Arrhenius behavior and the measured activation energy of 0.23 eV, the room temperature lithium diffusion coefficient is estimated to be $2.1 \times 10^{-12}$ m$^2 \cdot$s$^{-1}$ (Table 1).

$Li_xNb_{18}W_{16}O_{93}$ (x=3.4, 6.8, 10.2) exhibited similar diffusion and activation energies, with room temperature diffusion coefficients of $1.1 \times 10^{-13}$ m$^2 \cdot$s$^{-1}$ and Ea in the range of 0.27 to 0.30 eV.

TABLE 1

$D_{Li}$ and $E_a$ measurements for selected niobium tungsten oxide materials

| Compound | $D_{Li}$ (m$^2 \cdot$s$^{-1}$) at 298K | $D_{Li}$ (m$^2 \cdot$s$^{-1}$) at 413K | $E_a$ (eV) |
|---|---|---|---|
| $Li_{6.3}Nb_{16}W_5O_{55}$-a (15%) | $2.1 \times 10^{-12}$ | $2.7 \times 10^{-11}$ | $0.23 \pm 0.04$ |
| $Li_{6.3}Nb_{16}W_5O_{55}$-b (85%) | $1.7 \times 10^{-13}$ | $5.2 \times 10^{-13}$ | $0.10 \pm 0.04$ |
| $Li_{8.4}Nb_{16}W_5O_{55}$ | $1.6 \times 10^{-13}$ | $6.5 \times 10^{-13}$ (403K) | $0.13 \pm 0.01$ |
| $Li_{3.4}Nb_{18}W_{16}O_{93}$ | $1.1 \times 10^{-13}$ | $2.0 \times 10^{-12}$ | $0.27 \pm 0.03$ |
| $Li_{6.8}Nb_{18}W_{16}O_{93}$ | $1.1 \times 10^{-13}$ | $1.8 \times 10^{-12}$ | $0.30 \pm 0.01$ |
| $Li_{10.2}Nb_{18}W_{16}O_{93}$ | $1.1 \times 10^{-13}$ | $2.7 \times 10^{-12}$ | $0.29 \pm 0.01$ |

Lithium diffusion in both niobium tungsten oxide structures is markedly faster than that of $Li_{4+x}Ti_5O_{12}$ or $Li_xTiO_2$ at ca. $10^{-16}$-$10^{-15}$ m$^2 \cdot$s$^{-1}$ and is close to the best known lithium solid electrolytes (Table 2).

PFG NMR (FIG. 11) results indicate that initial lithium ion diffusion is of the order $10^{-12}$ to $10^{-13}$ m$^2 \cdot$s$^{-1}$ while galvanostatic intermittent titration technique (GITT) measurements (FIG. 12) show that the niobium tungsten oxides retain this rapid motion to high capacities (≥1.5 Li$^+$/TM) where the diffusion then drops by about two orders-of-magnitude toward 2.0 Li$^+$/TM. This suggests that the inherent range of the niobium tungsten oxide electrode materials for high-rate multiredox extends to approximately 1.5 Li$^+$/TM. The diffusion coefficients on the order of $10^{-12}$ to $10^{-13}$ m$^2 \cdot$s$^{-1}$ measured for these materials are consistent with the values required to achieve full lithiation of 6 to 19 μm particles on a 60C timescale.

TABLE 2

$D_{Li}$ measurements for known materials

| Compound | Structure Type | $D_{Li}$ (m$^2 \cdot$s$^{-1}$) | T (K) | Technique | Reference |
|---|---|---|---|---|---|
| $Li_{10}GeP_2S_{12}$ | Thio-LISICON | $2 \times 10^{-12}$ | 298 | PFG NMR | Kuhn, et al. (2013) |
| $Li_{10}GeP_2S_{12}$ | Thio-LISICON | $4 \times 10^{-11}$ | 453 | PFG NMR | Kuhn, et al. (2013) |
| $Li_7GePS_8$ | Thio-LISICON | $2 \times 10^{-12}$ | 298 | PFG NMR | Kuhn, et al. (2013) |
| $Li_7GePS_8$ | Thio-LISICON | $4 \times 10^{-11}$ | 453 | PFG NMR | Kuhn, et al. (2013) |
| $Li_{10}SnP_2S_{12}$ | Thio-LISICON | $1.4 \times 10^{-12}$ | 298 | PFG NMR | Kuhn, et al. (2014) |
| $Li_{10}SnP_2S_{12}$ | Thio-LISICON | $4 \times 10^{-11}$ | 453 | PFG NMR | Kuhn, et al. (2014) |
| $Li_{11}Si_2PS_{12}$ | Thio-LISICON | $3.5 \times 10^{-12}$ | 298 | PFG NMR | Kuhn, et al. (2014) |
| $Li_{11}Si_2PS_{12}$ | Thio-LISICON | $4 \times 10^{-11}$ | 453 | PFG NMR | Kuhn, et al. (2014) |
| $Li_7P_3S_{11}$ | Thio-LISICON | $1\text{-}5 \times 10^{-12}$ | 303 | PFG NMR | Hayamizu, et al. (2013) |
| $Li_7P_3S_{11}$ | Thio-LISICON | $2\text{-}11 \times 10^{-12}$ | 353 | PFG NMR | Hayamizu, et al. (2013) |
| β-$Li_3PS_4$ | Thio-LISICON | $5.4 \times 10^{-13}$ | 373 | PFG NMR | Gobet, et al. |
| amorphous-$Li_3PS_4$ | Amorphous (Thio-LISICON) | $6.5 \times 10^{-13}$ | 303 | PFG NMR | Hayamizu, et al. (2016) |
| amorphous-$Li_3PS_4$ | Amorphous (Thio-LISICON) | $1.6\text{-}3.4 \times 10^{-12}$ | 353 | PFG NMR | Hayamizu, et al. (2016) |
| $Li_{0.6}[Li_{0.2}Sn_{0.8}S_2]$ | Layered (O1) | $2\text{-}20 \times 10^{-12}$ | 298 | PFG NMR | Holzmann, et al. |
| $Li_{0.6}[Li_{0.2}Sn_{0.8}S_2]$ | Layered (O1) | $2.6 \times 10^{-10}$ | 407 | PFG NMR | Holzmann, et al. |
| $Li_{3.4}V_{0.6}Si_{0.4}O_4$ | LISICON | $5 \times 10^{-15}$ | 333 | tracer | Ishiyama, et al. |
| $Li_{1.5}Al_{0.5}Ge_{1.5}(PO_4)_3$ | NASICON | $2.9 \times 10^{-13}$ | 311 | PFG NMR | Hayamizu et al. (2017) |
| $Li_{1.2}Al_{0.2}Ti_{1.8}(PO_4)_3$ | NASICON | $1.5 \times 10^{-12}$ | 250 | NMR relaxometry PFG NMR | Arbi, et al. |
| $Li_{6.6}La_3Zr_{1.6}Ta_{0.4}O_{12}$ | Garnet | $3.5 \times 10^{-13}$ | 353 | PFG NMR | Hayamizu et al. (2015) |
| $Li_7La_3Zr_2O_{12}$ | Garnet | $1.8 \times 10^{-18}$ | 298 | NMR relaxometry | Kuhn, et al. (2011) |
| $Li_7La_3Zr_2O_{12}$ | Garnet | $1.3 \times 10^{-17}$ | 325 | NMR relaxometry | Kuhn, et al. (2011) |
| $Li_7La_3Zr_2O_{12}$ | Garnet | $3.3 \times 10^{-14}$ | 530 | NMR relaxometry | Kuhn, et al. (2011) |
| Graphite (Stage I) | Graphite | $1\text{-}2 \times 10^{-15}$ | 298 | NMR relaxometry | Langer, et al. |
| Li metal | bcc | $5 \times 10^{-15}$ | 298 | PFG NMR (extrapolated) | Mali, et al. |
| Li metal | bcc | $1 \times 10^{-12}$ | 400 | PFG NMR | Mali, et al. |
| $Li_4Ti_5O_{12}$ | Spinel | $3.2 \times 10^{-15}$ | 298 | μ$^+$-SR | Sugiyama, et al. |
| $Li_{5.7}Ti_5O_{12}$ | Spinel | $2.7 \times 10^{-16}$ | 298 | NMR relaxometry | Wilkening, et al. |
| $LiTi_2O_4$ | Spinel | $3.6 \times 10^{-15}$ | 298 | μ$^+$-SR | Sugiyama, et al. |
| β-$Li_2TiO_3$ | $Li_2SnO_3$ | $2 \times 10^{-17}$ | 433 | NMR relaxometry | Ruprecht, et al. |

TABLE 2-continued $D_{Li}$ measurements for known materials

| Compound | Structure Type | $D_{Li}$ (m² · s⁻¹) | T (K) | Technique | Reference |
|---|---|---|---|---|---|
| $Li_{0.12}TiO_2$ micro | Anatase component | $4.7 \times 10^{-16}$ | 293 | NMR relaxometry | Wagemaker, et al. (2001) |
| $Li_{0.12}TiO_2$ micro | Li-titanate component | $1.3 \times 10^{-15}$ | 293 | NMR relaxometry | Wagemaker, et al.(2001) |
| $Li_{0.06}TiO_2$ nano | Anatase component | $1.9 \times 10^{-16}$ | 293 | NMR relaxometry | Wagemaker, et al. (2007) |
| $Li_{0.06}TiO_2$ nano | Li-titanate component | $5.7 \times 10^{-16}$ | 293 | NMR relaxometry | Wagemaker, et al. (2007) |
| $Li_{0.12}TiO_2$ nano | Anatase component | $1.1 \times 10^{-16}$ | 293 | NMR relaxometry | Wagemaker, et al. (2007) |
| $Li_{0.12}TiO_2$ nano | Li-titanate component | $1.8 \times 10^{-16}$ | 293 | NMR relaxometry | Wagemaker, et al. (2007) |
| $Li_{0.12}TiO_2$ nano | Li-titanate component | $4.9 \times 10^{-16}$ | 413 | NMR relaxometry | Wagemaker, et al. (2007) |
| $Li_{0.55}TiO_2$ nano | Li-titanate | $1.7 \times 10^{-16}$ | 293 | NMR relaxometry | Wagemaker, et al. (2007) |
| $Li_{0.55}TiO_2$ nano | Li-titanate | $4.6 \times 10^{-16}$ | 413 | NMR relaxometry | Wagemaker, et al. (2007) |
| $LiMn_2O_4$ | Spinel | $1 \times 10^{-20}$ | 350 | NMR relaxometry | Verhoevenm et al. |
| $LiMn_2O_4$ | Spinel | $1.8 \times 10^{-16}$ | 623 | Tracer | Ishiyama, et al. (2016) |
| $LiNbO_3$ | $LiNbO_3$ | $7.5 \times 10^{-15}$ | 890 | NMR relaxometry | Bork and Heitjans |
| $Li_3NbO_4$ | $Li_3NbO_4$ | $4 \times 10^{-21}$ | 353 | NMR relaxometry | Ruprecht and Heitjans |
| $Li_3NbO_4$ | $Li_3NbO_4$ | $1 \times 10^{-16}$ | 553 | NMR relaxometry | Ruprecht and Heitjans |

Abbreviations: bcc = body-centered cubic, µ⁺-SR = muon spin resonance

Galvanostatic Intermittent Titration Technique (GITT)

Information on electrode thermodynamics, including phase transitions, and lithium kinetics can in principle be extracted from GITT measurements by tracking the voltage evolution after a brief current pulse as lithium diffuses and the chemical potential equilibrates within the electrode/particles. Reliable quantitative diffusion coefficients, Du, are, however, difficult to extract from GITT alone. In order to determine a diffusion coefficient from GITT measurements, a diffusion length (L) must be defined but a battery electrode is a heterogeneous system. First, it is a composite of active material (here, metal oxide), porous carbon, and polymeric binder. Within this composite, there will be a distribution of particle sizes (unless single crystals or well-defined particles are employed; even then the diffusion varies with lattice direction). Furthermore, different regimes of diffusion must exist as there are solid/liquid interfaces and porous electrode structure. Nevertheless, in an electrode that does not undergo severe pulverization (e.g. an intercalation electrode), L is a fixed quantity throughout the experiment. Variation in L—a parameter required to relate the rate of relaxation to the diffusion—causes values of Du to vary significantly between reports even for the same material. Thus, while a physically meaningful diffusion coefficient may not be extracted, a relative measure of diffusion is readily obtained. For this reason, we use an extracted proxy for lithium diffusion ($D_{Li} \cdot L^{-2}$, FIG. 12), which removes the uncertainty in L and enables self-consistent analysis of a single electrode and electrodes prepared under identical conditions. The addition of quantitative information from another method, e.g., NMR spectroscopy, allows us to calibrate relative changes in Li⁺ kinetics to quantitative diffusion values throughout a range of lithiation.

Figure 12:
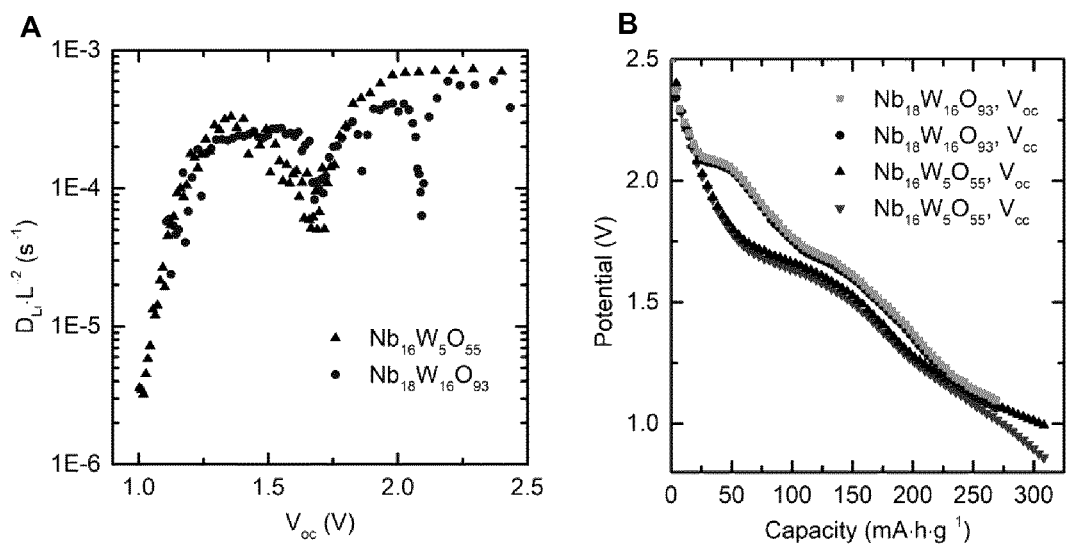
FIG. 12 shows (A) relative changes in lithium diffusion as a function of open-circuit voltage (Voc) and (B) open-circuit voltage vs. closed-circuit voltage (Vcc) from galvanostatic intermittent titration technique (GITT) measurements showing the "thermodynamic" electrochemical profiles at C/20 rate with a 12 h rest period at each point, reaching a full discharge in approximately one month.

As shown in FIG. 12, in $Nb_{16}W_5O_{55}$, the fastest diffusion is observed from the dilute limit to $Li_{4.5(5)}Nb_{16}W_5O_{55}$, dropping by two orders-of-magnitude in the low voltage window where more than 1 Li⁺/TM is incorporated. The GITT data indicates that the 2ⁿᵈ electrochemical region of $Nb_{16}W_5O_{55}$ is broader than typically observed for a two-phase reaction but the observed discontinuity in the $D_{Li} \cdot L^{-2}$ values in this region suggests that it is approaching two-phase behavior. The average diffusion coefficient in $Nb_{18}W_{16}O_{93}$ is similar to that of $Nb_{16}W_5O_{55}$. The bronze also displays discontinuities at 2.1, 1.85, and 1.7 V. In both phases, the low voltage region—below 1.25 V, well over 1 Li⁺/TM—is characterized by an increasing overpotential and suppressed kinetics.

Anode Material Ragone Plot

Figure 13A:
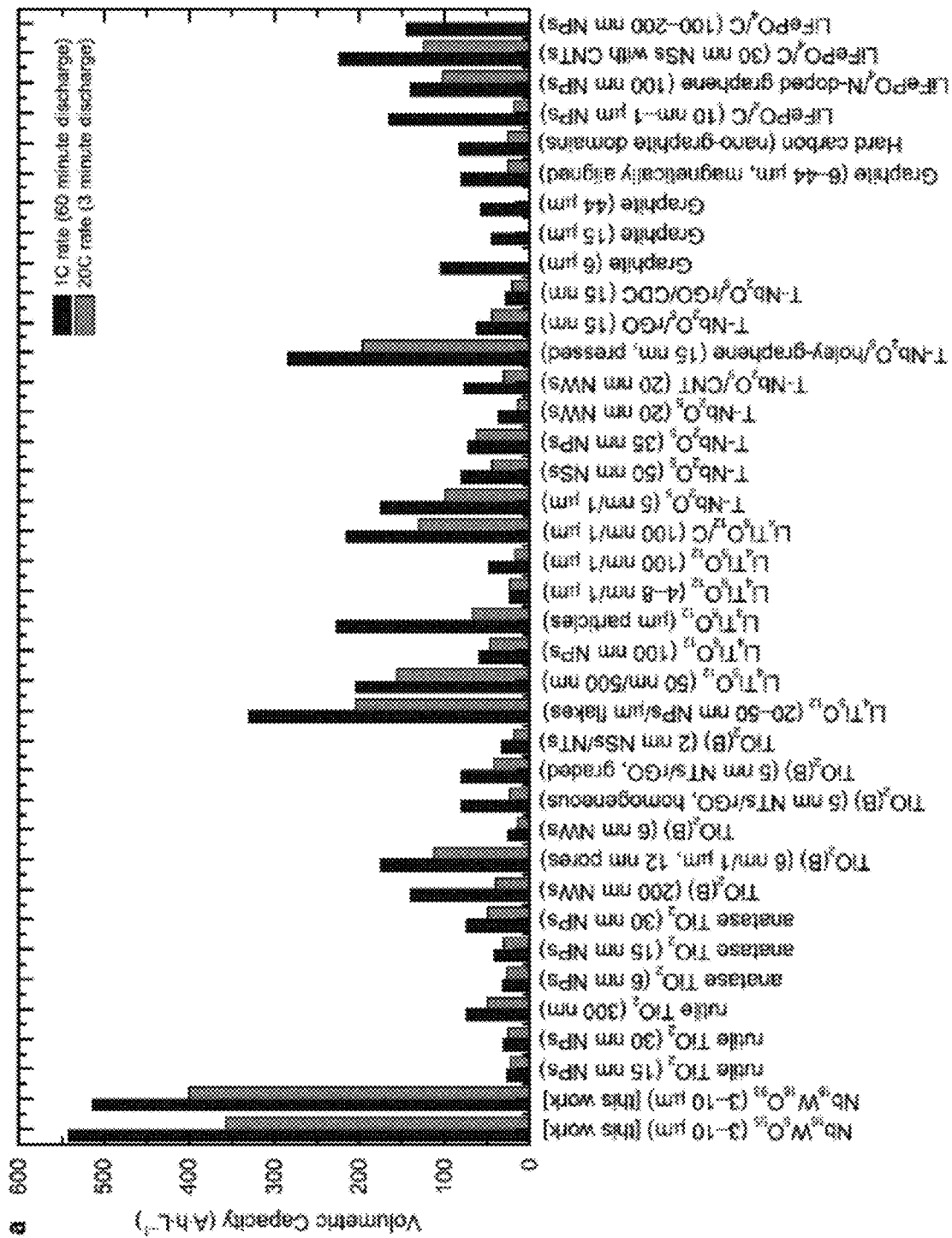
FIG. 13 shows (A) $Nb_{16}W_5O_{55}$ and $Nb_{18}W_{16}O_{93}$ from this work as compared to high-rate electrode formulations from the literature. Volumetric capacities at 1C and 20C are determined from reported capacities and reported, measured, or estimated tap densities. (B) Ragone (log-log) plot of energy density and power density on the basis of anode active materials vs. a 4.0 V cathode. The mass loading of the niobium tungsten oxides here was 2.6 $mg \cdot cm^{-2}$, the mass loading of the other titanium and niobium-based materials was typically ca. 1 $mg \cdot cm^{-2}$. Graphite is included as a reference, though it cannot be used for high-rate applications due to lithium plating risks and particle fracture. Literature values for the Ragone plot were extracted with WebPlotDigitizer.
Figure 13B:
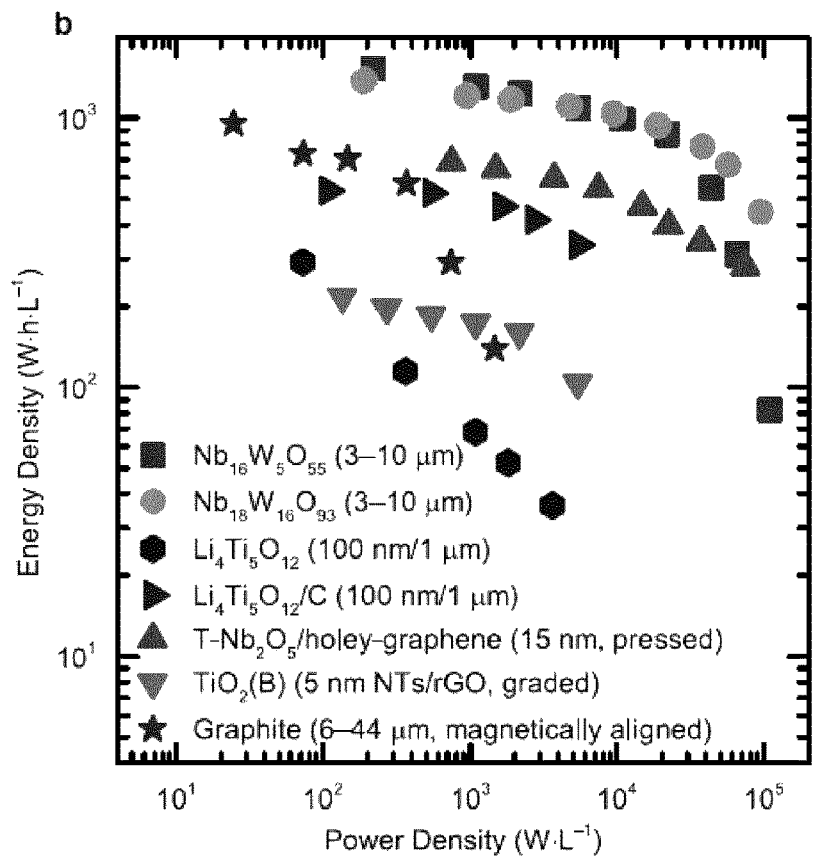

Anode material Ragone plot: the energy density of a cathode material is the product of capacity (Q) and voltage (V); however, this product does not work when comparing anode materials, where energy and voltage have an inverse relationship. In the calculation of the anode material Ragone plot in FIG. 13, the energy (E) is computed based on the voltage difference versus a 4.0 V cathode. Thus, normalized to the anode, $E_{anode}=(V_{cathode}-V_{anode})*Q_{anode}$.

Figure 14:
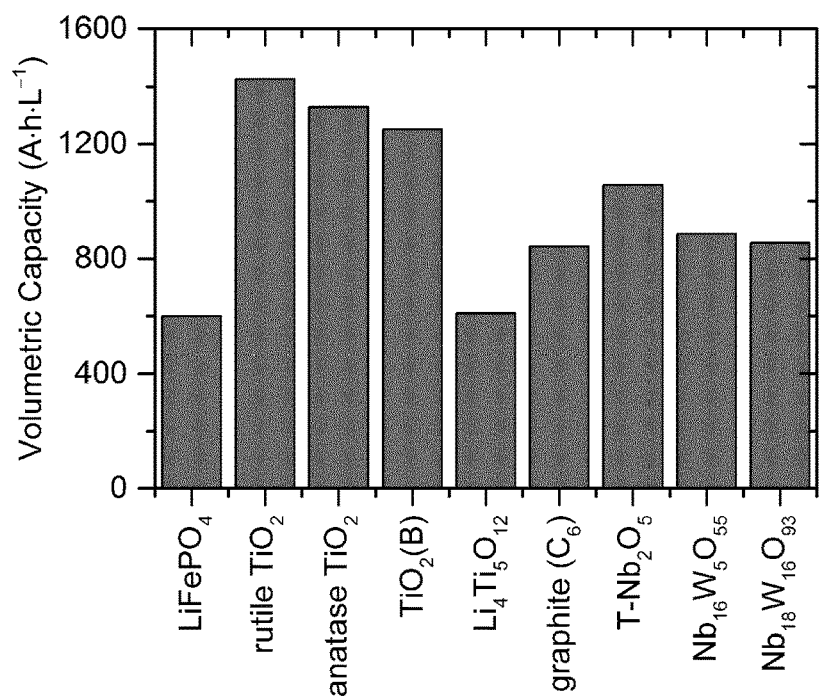
FIG. 14 shows theoretical volumetric capacity assuming a reaction of one electron per transition metal and crystallographic (single crystal) densities. The capacity for $Li_4Ti_5O_{12}$ is shown for the well-established reaction to $Li_7Ti_5O_{12}$; the capacity of graphite is based on the reaction of one electron per $C_6$ unit.

When compared strictly on the basis of theoretical 1.0 Li+/TM reaction and crystallographic density of the active material, titania, niobia, and graphite all display theoretical charge densities of greater than 800 A·h·L⁻¹ (FIG. 14). Once experimental capacities and tap density are considered (FIG. 13A), the bulk, unoptimized niobium tungsten oxides presented here maintain volumetric charge densities of greater than 500 A·h·L⁻¹ at 1C and up to 400 A·h·L⁻¹ at 20 C, volumetric performance that even the most optimised versions of $TiO_2$, $Nb_2O_5$, LTO cannot achieve. This is not to say that the compounds presented cannot be improved by methods such as nanostructuring, calendaring, or carbon-coating as demonstrated by e.g. Sun et al. with holey-graphene scaffolds but to prove that large micrometer particles can be used for high-rate electrodes and illustrate that nanosizing is not always the most appropriate strategy to improve performance. This is evident in a Ragone plot (FIG. 13B), which shows the higher energy densities of the new bulk niobium tungsten oxides, as compared to state-of-the-art high-rate anode materials and to graphite.

Commercial Materials—Half-Cell Tests

Additionally, in order to test the suitability of the niobium tungsten oxides as high-rate anode materials, the commercially-available high-rate cathode materials NMC622 ($LiNi_{0.6}Mn_{0.2}CO_{0.2}O_2$; Targray), lithium iron phosphate ($LiFePO_4$; Johnson Matthey) and $LiMn_2O_4$ (MTI Corp) were purchased. These commercial materials were first characterised in half-cell geometry against Li metal. Electrochemical measurements were conducted using a stainless steel 2032-coin cell and glass microfiber separator in the same manner as for $Nb_{16}W_5O_{55}$ and $Nb_{18}W_{16}O_{93}$ described above. The commercial cathode material, conductive carbon (Li-250 carbon; Deka Chemicals) and PVDF were ground together in the same manner as described above to prepare an 80/10/10 electrode (comprising 80 wt % active material, 10 wt % carbon and 10 wt % polymer) which served as the cathode against a Li metal disk anode in half-cell geometry. The electrolyte was 150 µL LP30. No additives were used.

Figure 17A:
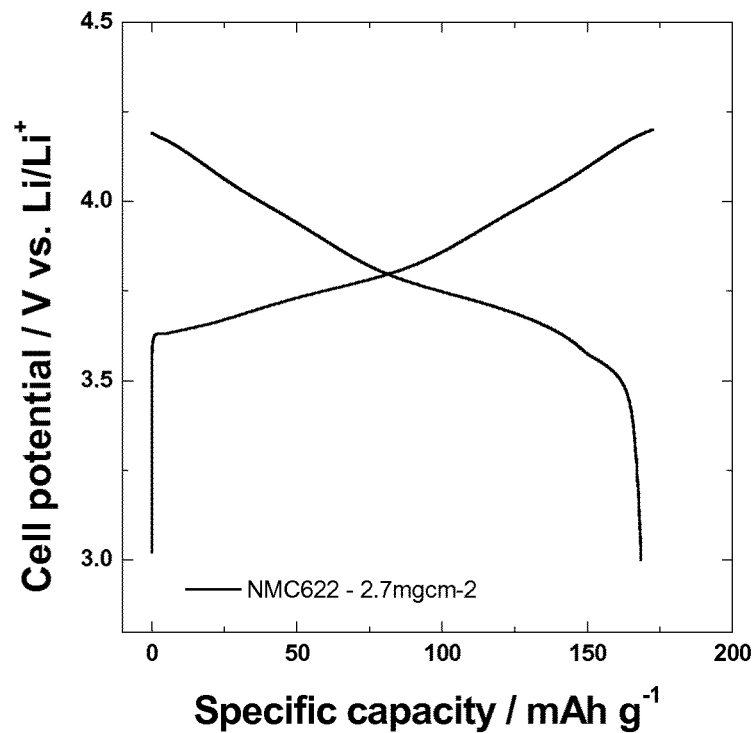
FIG. 17 shows discharge and charge voltage profiles of (A) NMC622 ($LiNi_{0.6}Co_{0.2}Mn_{0.2}O_2$), (B) $LiFePO_4$ and (C) $LiMn_2O_4$ against $Li/Li^+$.
Figure 17B:
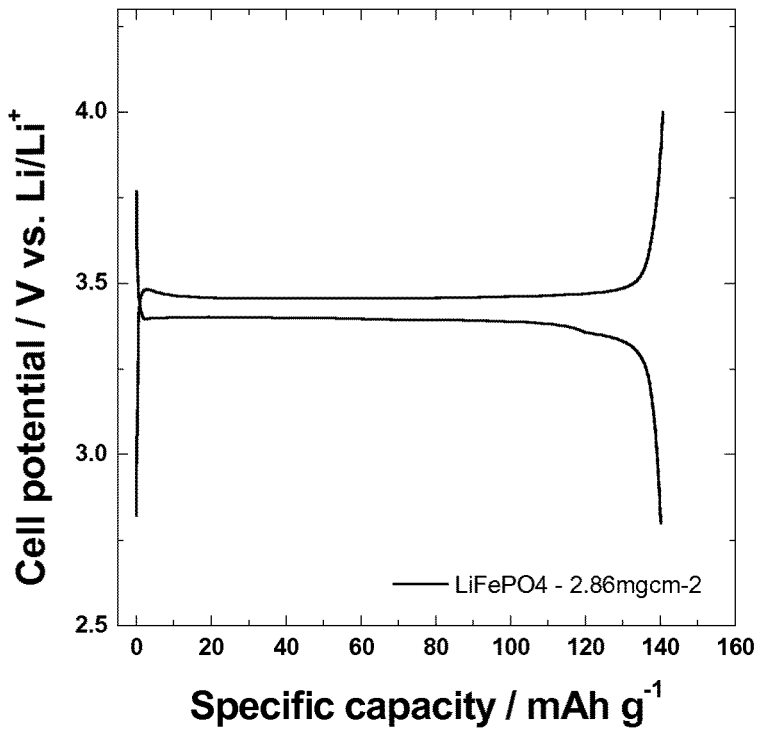
Figure 17C:
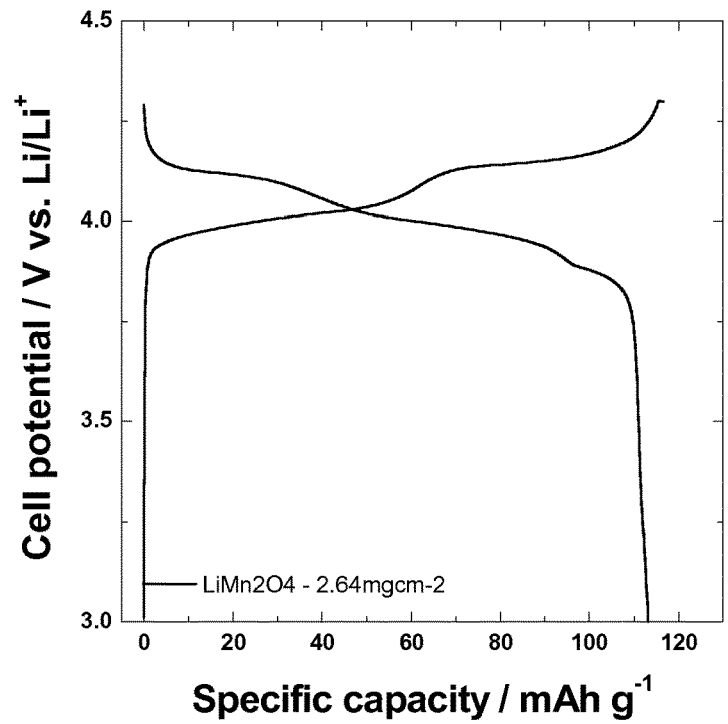

NMC622 showed an average voltage of 3.8 V and a practical capacity of 175 mA·h·g$^{-1}$ under these conditions (FIG. 17A). LiFePO$_4$ showed an average voltage of 3.4 V and a practical capacity of 165 mA·h·g$^{-1}$ (FIG. 17B), and LiMn$_2$O$_4$ showed an average voltage of 4.0 V and a practical capacity of 120 mA·h·g$^{-1}$ (FIG. 17C).

Electrode Optimisation—Nb$_{16}$W$_5$O$_{55}$

In order to optimise the performance of the Nb$_{16}$W$_5$O$_{55}$ electrode, a series of electrodes were made to the specifications set out in Table 3, below. Electrochemical characterisation was conducting using a stainless steel 2032 coin cell and glass microfiber separator as described above. A Li metal disk was used as anode in half-cell geometry. The electrolyte was 150 UL LP30. No additives were used.

TABLE 3

Electrode Optimisation

| Entry | Active | Separator | Carbon | Binder | Calendaring |
|---|---|---|---|---|---|
| Ref | 80% Nb$_{16}$W$_5$O$_{55}$ | Glass microfiber | 10% Super P | 10% PVDF | No |
| 1 | 80% Nb$_{16}$W$_5$O$_{55}$ | Polypropylene[1] | 10% Super P | 10% PVDF | No |
| 2 | 80% Nb$_{16}$W$_5$O$_{55}$ | Glass microfiber | 10% Super P | 4% SRB[2] 1% CMC[3] | No |
| 3 | 80% Nb$_{16}$W$_5$O$_{55}$ | Glass microfiber | 15% Super P | 5% PVDF | No |
| 4 | 80% Nb$_{16}$W$_5$O$_{55}$ | Glass microfiber | 8% Super P 2% CNT[4] | 10% PVDF | No |
| 5 | 80% Nb$_{16}$W$_5$O$_{55}$ | Glass microfiber | 10% Super P | 10% PVDF | Yes |

[1]Celgard;
[2]Styrene-butadiene rubber (Zeon);
[3]Carboxymethyl cellulose (Sigma Aldrich);
[4]Carbon nanotubes (Sigma Aldrich)

Figure 18:
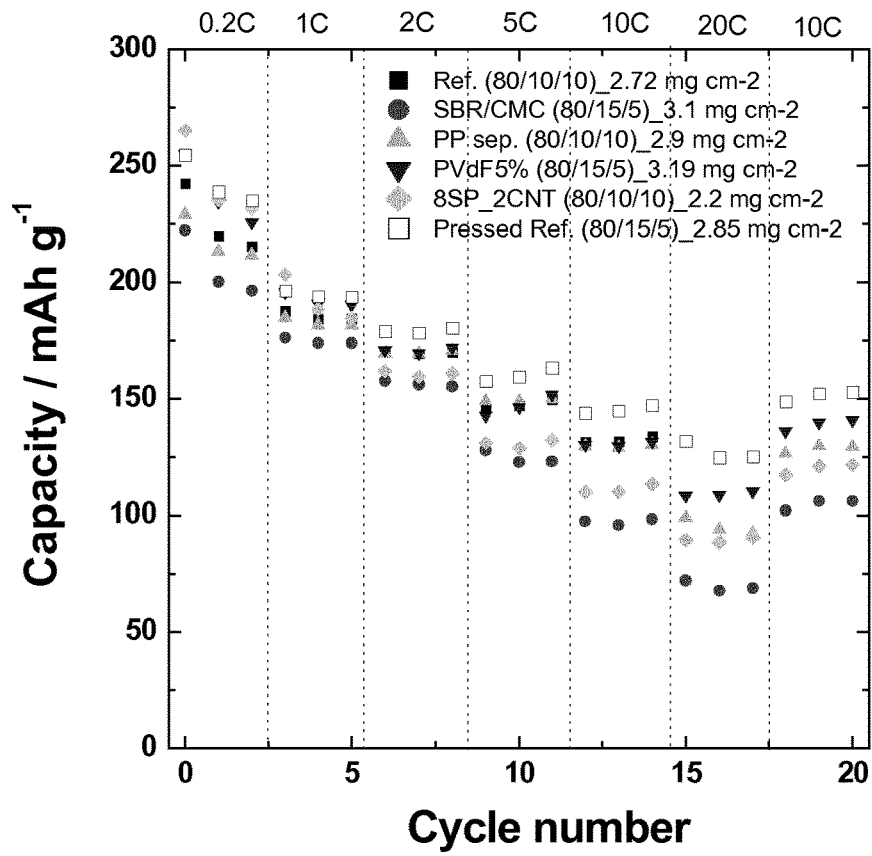
FIG. 18 compares capacity at varying charge and discharge rates for electrodes comprising $Nb_{16}W_5O_{55}$ and different separators, binders, binder quantity, conductive carbon type and with calendaring of the electrode.

Bulk rate performance was shown to be improved where 5 wt % PVDF or 4 wt % SRB and 1 w % CMC as binder (FIG. 18). Calandering also consistently improved electrode performance.

Full Cell Operation with Commercial Electrode Materials

To test the suitability of the niobium tungsten oxides as high-rate anode materials, full cells were produced using the commercially-available high-rate cathode materials NMC622, LiFePO$_4$ and LiMn$_2$O$_4$. Electrochemical measurements were conducted using a stainless steel 2032-coin cell and glass microfiber separator in the same manner as for Nb$_{16}$W$_5$O$_{55}$ and Nb$_{18}$W$_{16}$O$_{93}$ described above. The commercial cathode material, Li-250 carbon and PVDF were ground together as described above to prepare an 80/10/10 electrode (comprising 80 wt % active material, 10 wt % carbon and 10 wt % polymer) which served as cathode. The Nb$_{16}$W$_5$O$_{55}$, Li-250 carbon and PVDF were ground together to prepare an 80/10/10 electrode (comprising 80 wt % active material, 10 wt % carbon and 10 wt % polymer) which served as anode. When the cathode comprised NMC622, the anode comprised Nb$_{16}$W$_5$O$_{55}$, Li-250 carbon and PVDF in a 80/15/5 ratio. The electrolyte in all cases was 150 µL LP30. No additives were used. The capacity ratio of the anode and cathode was 1:1. For full cell balancing, the theoretical capacity of NMC622 was taken to be 175 mA·h·g$^{-1}$.

Figure 19A:
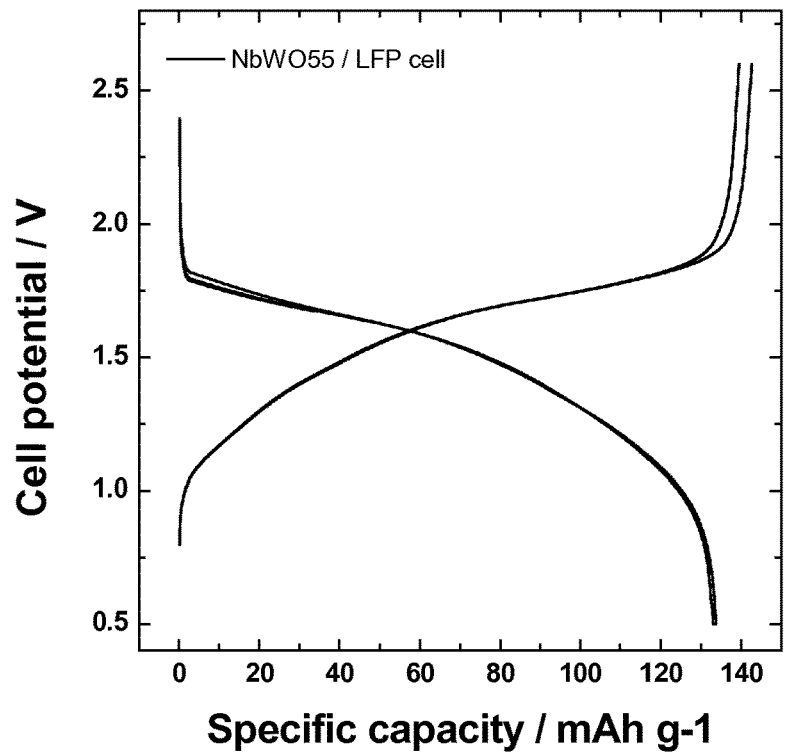
FIG. 19 shows discharge and charge voltage profiles of full cells comprising a $Nb_{16}W_5O_{55}$ anode and (A) $LiFePO_4$, (B) $LiMn_2O_4$, and (C) NMC622 cathode.
Figure 19B:
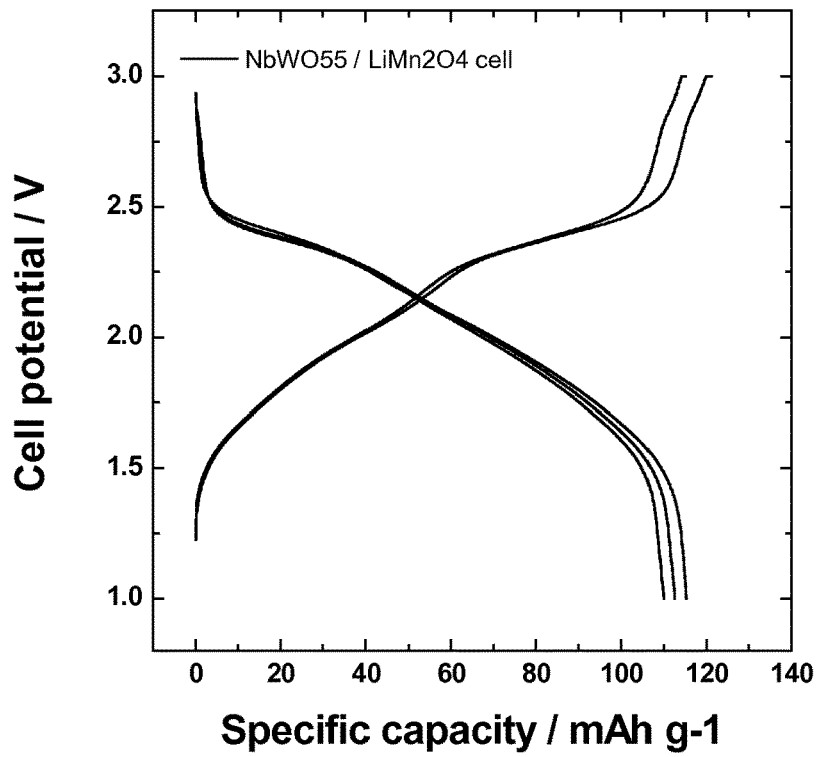
Figure 19C:
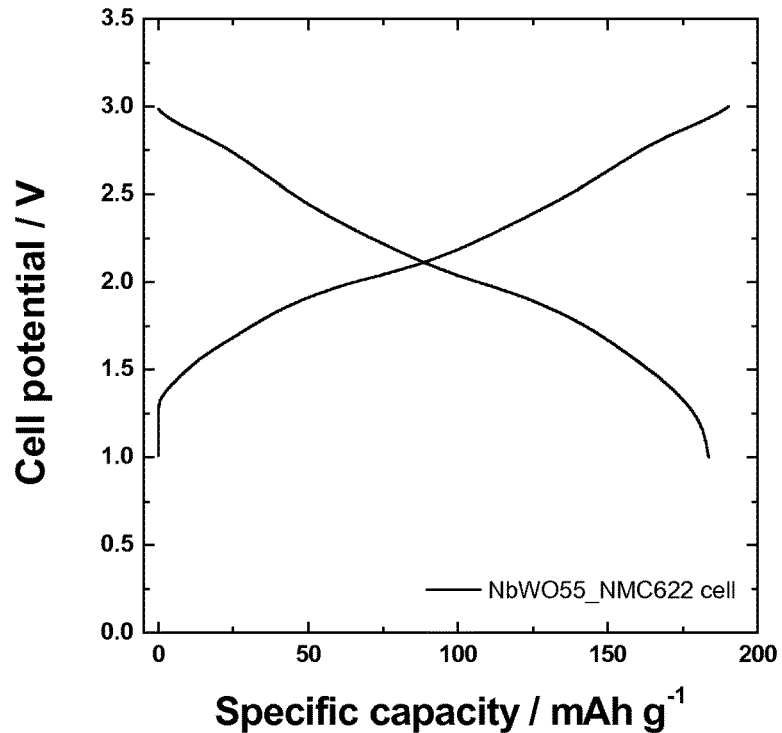

The full cells were evaluated between 1.0 and 3.0 V. The initial change/discharge curves of the full cells with LiFePO$_4$ and LiMn$_2$O$_4$ cathodes are shown in FIGS. 19A and 19B, respectively. At a low rate of C/5, the full cell against LiMn$_2$O$_4$ showed a capacity of 120 mA·h·g$^{-1}$, close to the practical capacity of the cathode. With LiFePO$_4$ as cathode, a capacity of 140 mA·h·g$^{-1}$ was measured. With NMC622 as cathode, a high capacity of 165 mA·h·g$^{-1}$ (FIG. 19C). Capacities are quoted based on the mass of the active cathode material.

Figure 19D:
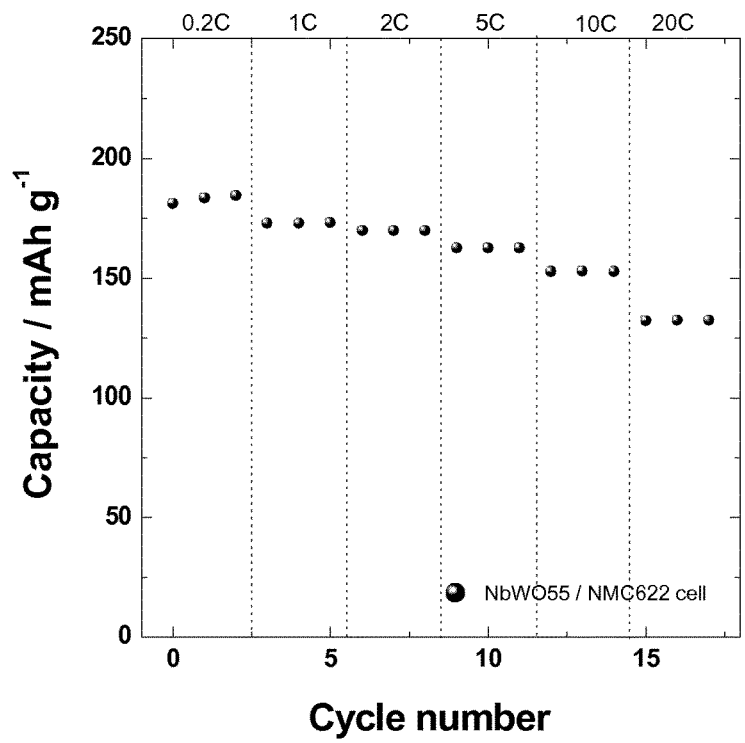
Figure 19E:
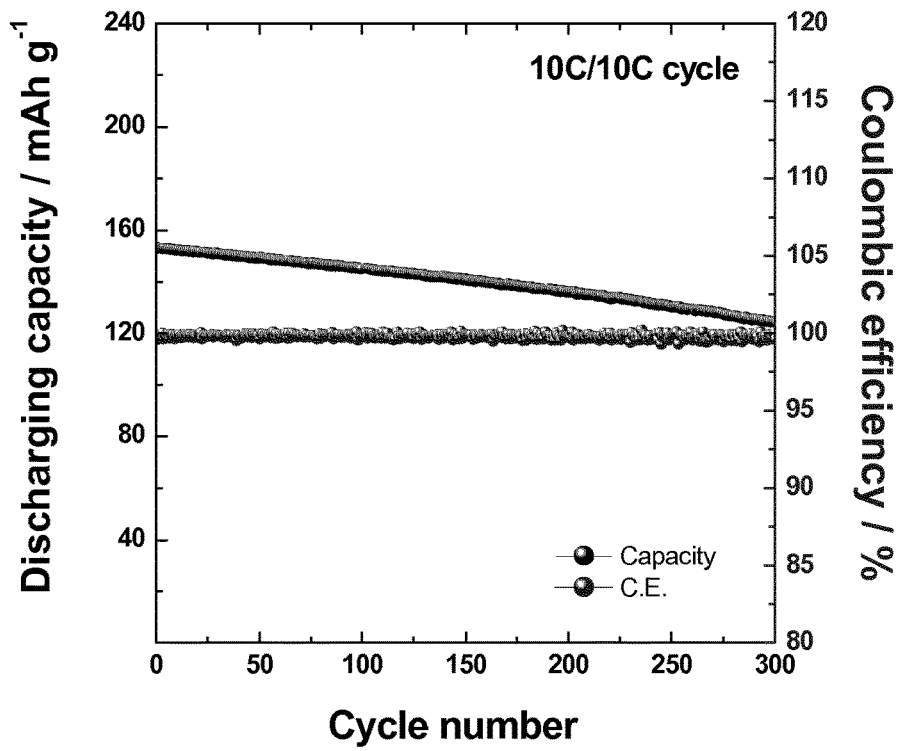
Figure 19F:
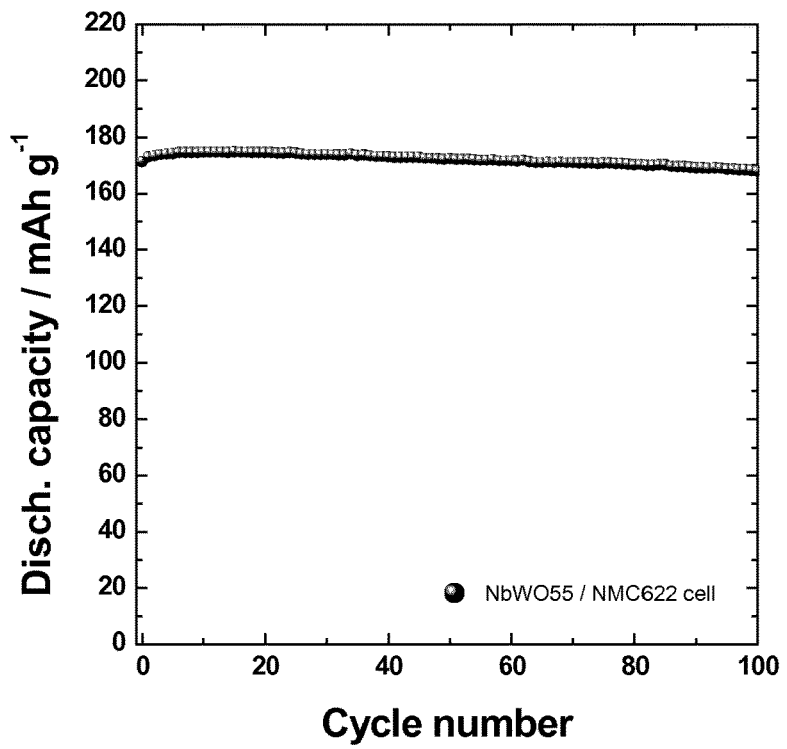

The rate performance of the NMC622 full cell was evaluated in a range of current densities from C/5 to 20C. The NMC622 full cell maintained a capacity of 125 mA·h·g$^{-1}$ at 20C, greater than 75% capacity retention relative to the capacity at C/5 (FIG. 19D). To test longer term cycling, the NMC622 full cell was cycled at 10C charge and 10C discharge rates for 300 cycles. Under these conditions, a capacity of 120 mA·h·g$^{-1}$ was observed after 300 cycles, corresponding to greater than 80% capacity retention (FIG. 19E). At lower rates, a very high capacity retention of over 98% was achieved for 100 cycles at 1C charge and 1C discharge (FIG. 19F).

Investigation of Electrode Degradation

Figure 20A:
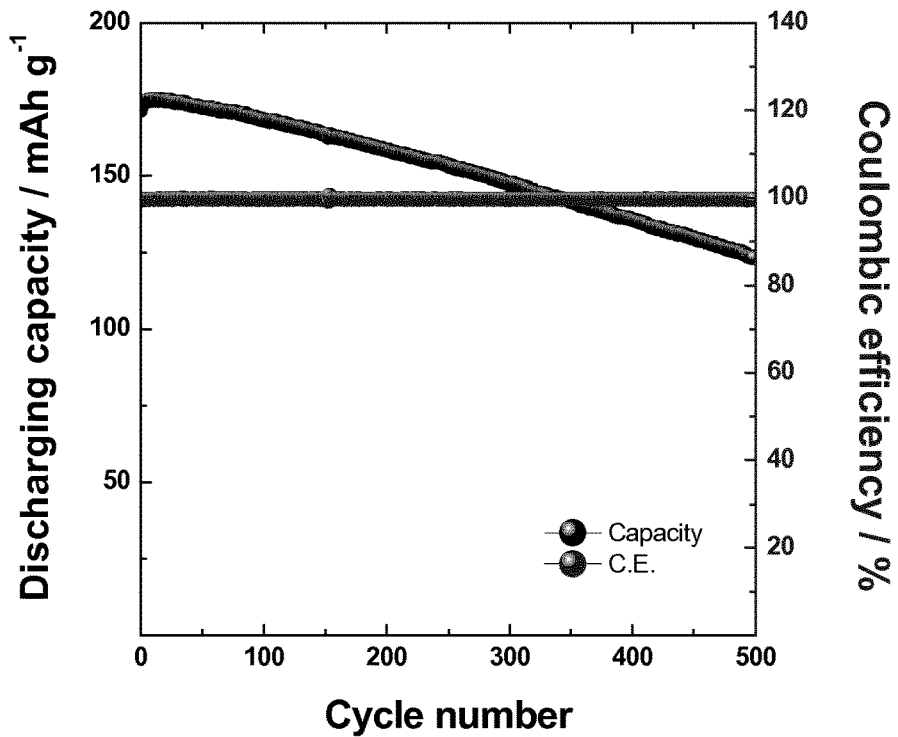
FIG. 20 shows (A) long-term cycling at 1C charge and discharge rates of a cell comprising a cell comprising a $Nb_{16}W_5O_{55}$ anode and NMC622 cathode; capacity (sloping); columbic efficiency (horizontal). (B) shows performance of the extracted NMC622 electrode against $Li^+/Li$. (C) shows performance of the extracted $Nb_{16}W_5O_{55}$ electrode against $Li^+/Li$.
Figure 20B:
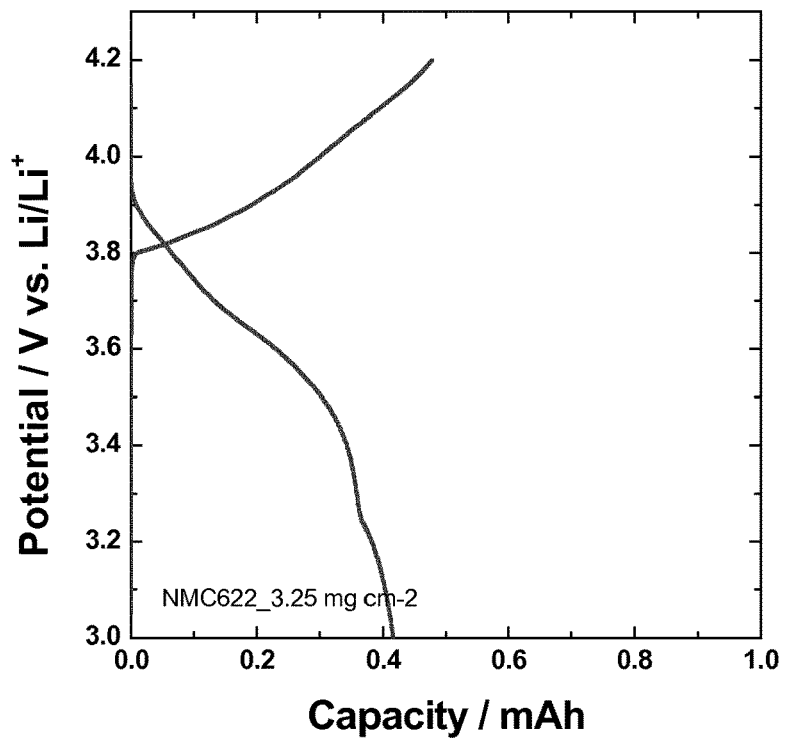
Figure 20C:
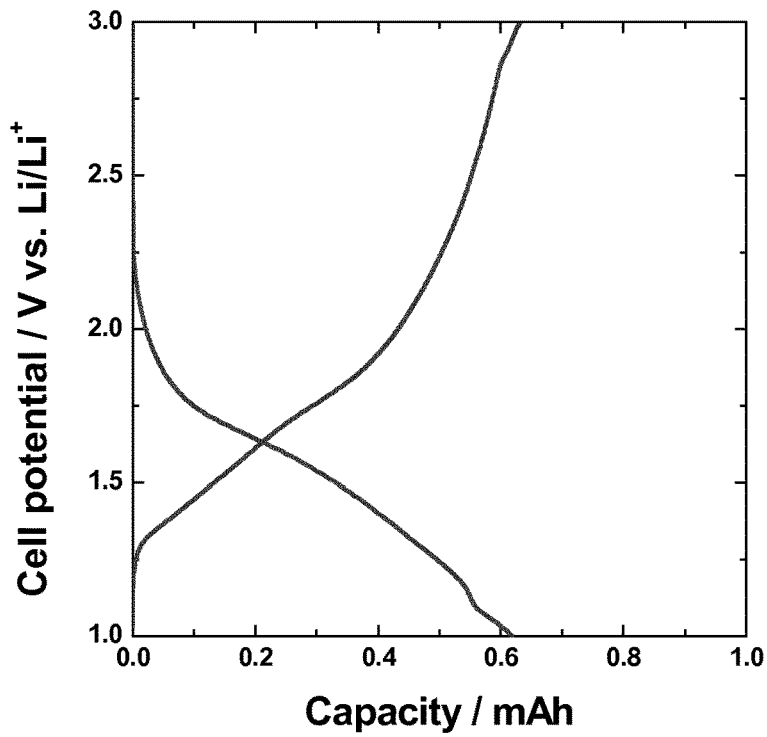

In order to investigate the cause of capacity loss, a full cell using a Nb$_{16}$W$_5$O$_{55}$ anode and NMC622 cathode as described above was cycled for 500 cycles at 1C change and 1C discharge. A 71.1% capacity retention was observed (FIG. 20A). The cell was disassembled and the cathode and anode reassembled into a cell against a Li metal electrode in half-cell geometry. As shown in FIG. 20B the extracted NMC622 electrode showed a capacity of 0.48 mAh. The initial capacity of an NMC622 half-cell in this configuration was 0.72 mAh. Thus, the NMC622 electrode showed a capacity retention of 67% (a capacity loss of 33%). In contrast, the extracted Nb$_{16}$W$_5$O$_{55}$ electrode showed a capacity of 0.62 mAh against an initial capacity of 0.73 mAh in this configuration (FIG. 20C). This corresponds to a capacity retention of 85% (a capacity loss of 15%). Thus, more than half the capacity loss observed in the full cell comprising the Nb$_{16}$W$_5$O$_{55}$ anode and NMC622 cathode arose from degradation of the NMC622 cathode. This indicates that the Nb$_{16}$W$_5$O$_{55}$ material is particularly a resilient electrode material.

Mixtures of Nb$_{16}$W$_5$O$_{55}$ and LTO as anode

Figure 5A:
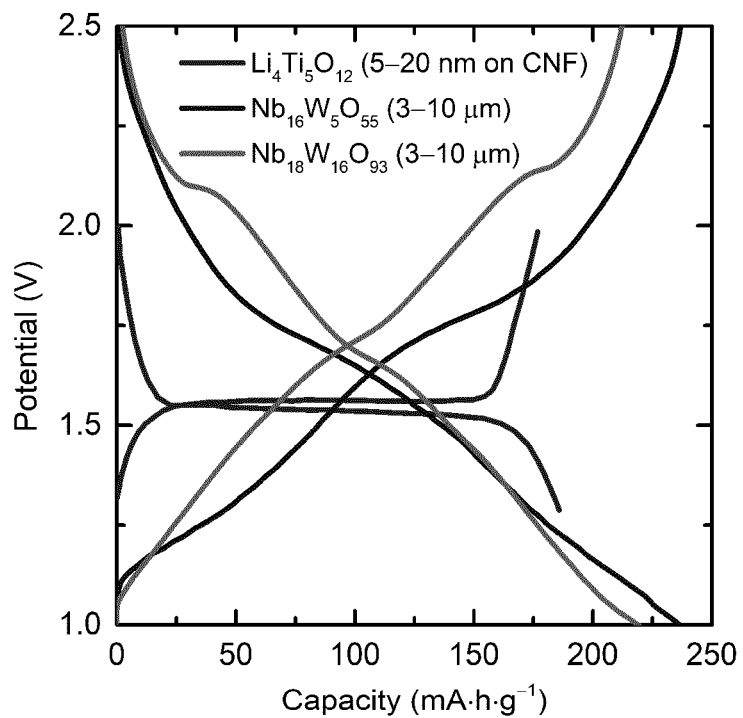
FIG. 5 shows voltage profiles of $Li_4Ti_5O_{12}$ (curves with plateau at 1.55 V), $Nb_{16}W_5O_{55}$ (curves crossing at 1.57 V) and $Nb_{18}W_{16}O_{93}$ (curves crossing at 1.65V). Discharge and charge voltage profiles normalized to (A) gravimetric capacity and (B) lithium ions transferred per transition metal atom. The average voltage of $Li_4Ti_5O_{12}$, $Nb_{16}W_5O_{55}$, and $Nb_{18}W_{16}O_{93}$ is 1.55 V, 1.57 V, and 1.65 V, respectively. The $Li_4Ti_5O_{12}$ electrochemistry shown here (extracted with WebPlotDigitizer 2017, Ankit Rohatgi) represents an optimal performance, consisting of 5-20 nm particles on 15-20 nm carbon nanofibers (CNF) with a mass loading of 1 $mg \cdot cm^{-2}$.
Figure 5B:
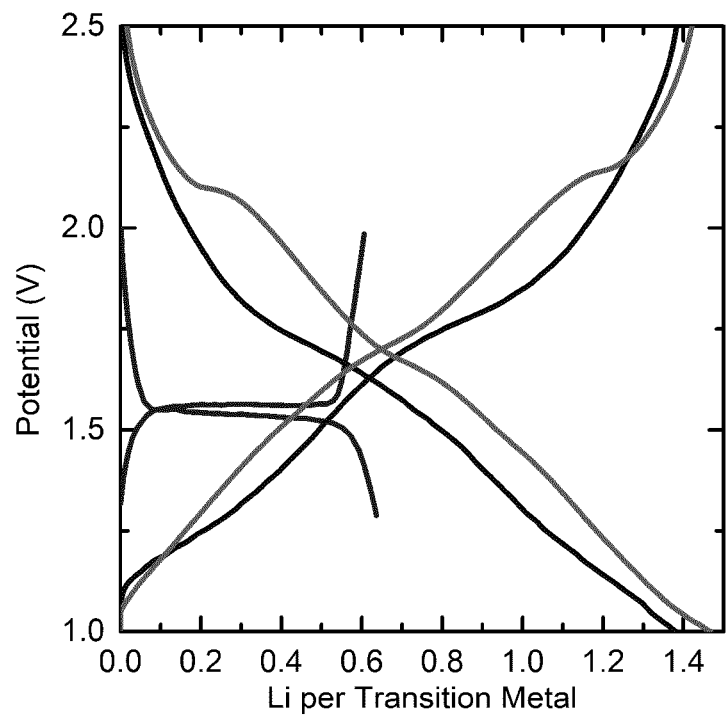
Figure 21A:
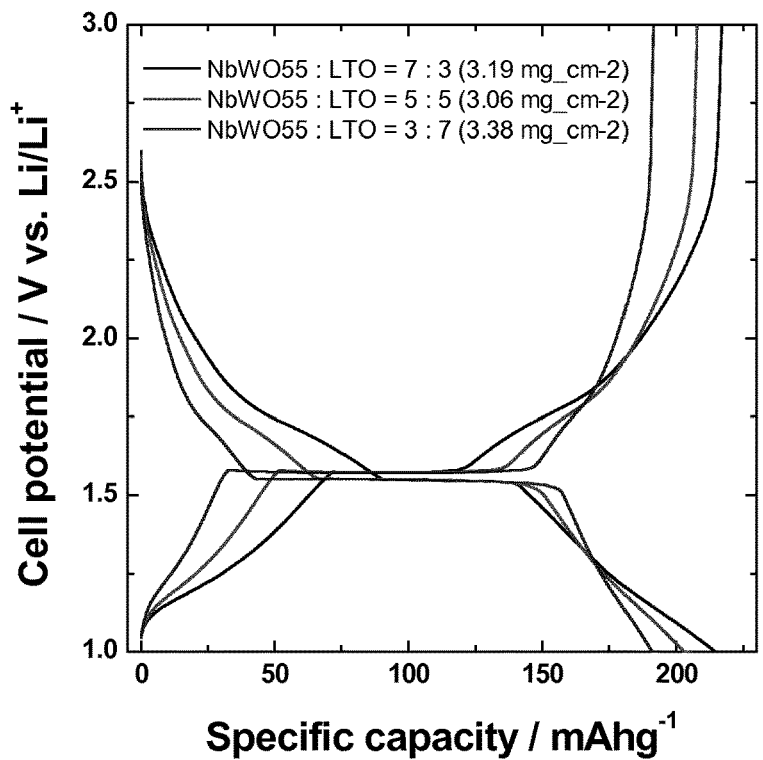
FIG. 21 shows (A) charge and discharge profiles of $Nb_{16}W_5O_{55}$-LTO mixtures in a ratio of 7:3, 1:1 and 3:7 normalised to gravimetric capacity, order of charging curves at 3.0 V: 3:7 (leftmost), 5:5 (second from left), 7:3 (rightmost); order of discharging curves at 1.0 V: 3:7 (leftmost), 5:5 (second from left) and 7:3 (rightmost). (B) rate performance of the mixtures, order at 0.2C: 7:3 (topmost), 5:5 (second from top), 3:7 (bottommost). (C) longer term cycle performance at 10C change and discharge rates, 1C points: 7:3 (topmost), 5:5 (second from top), 3:7 (bottommost); 10C curves: 3:7 (topmost), 5:5 (second from top), 7:3 (bottommost).
Figure 21B:
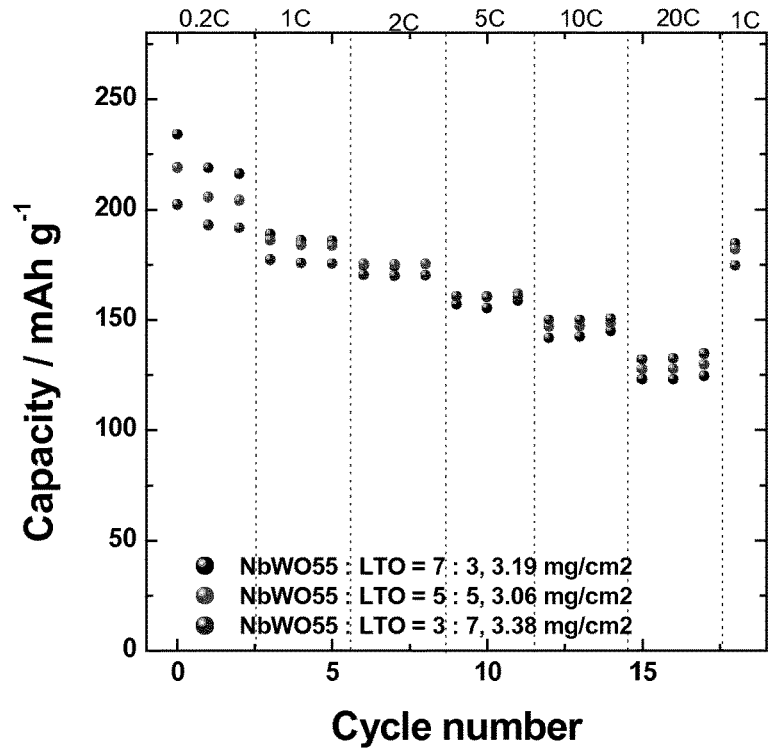
Figure 21C:
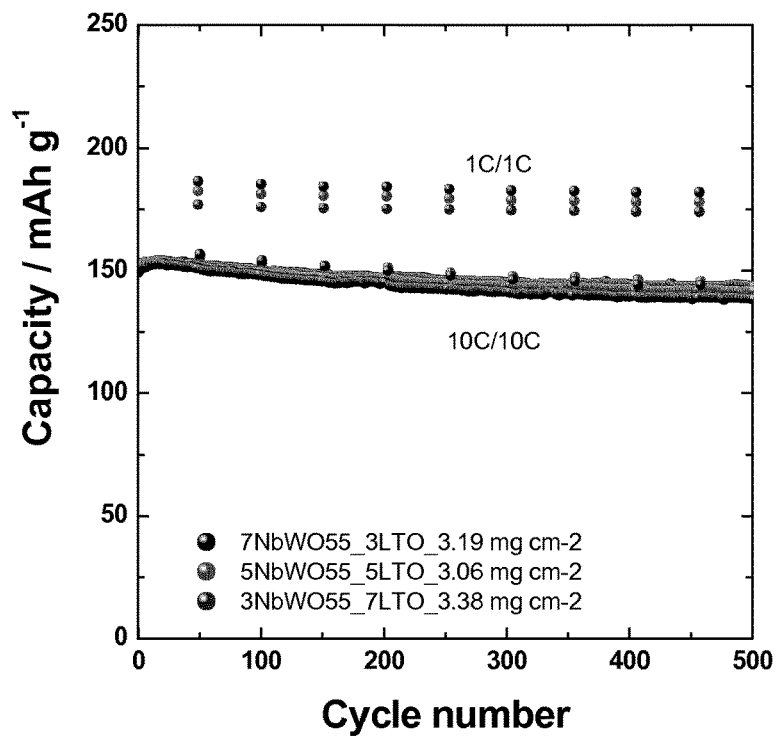

Additional experiments were carried out to test the use of a mixture of Nb$_{16}$W$_5$O$_{55}$ and LTO as electrode material. Electrodes comprising three different ratios of Nb$_{16}$W$_5$O$_{55}$ to LTO were produced and measured against an Li metal anode in the same manner as for Nb$_{16}$W$_5$O$_{55}$ and Nb$_{18}$W$_{16}$O$_{93}$ described above. The galvanostatic charge-discharge curves are shown in FIG. 21A normalised to gravimetric capacity. The average voltage of 1.55 V is close to that of pure LTO (FIG. 5A). In a ratio of 7:3 (Nb$_{16}$W$_5$O$_{55}$: LTO), a gravimetric capacity of 225 mA·h·g$^{-1}$ was observed at C/5, while 125 mA·h·g$^{-1}$ was seen at 20C (FIG. 21B). For 3:7 (Nb$_{16}$W$_5$O$_{55}$:LTO), a gravimetric capacity of 190 mA·h·g$^{-1}$ was observed at C/5, while 130 mA·h·g$^{-1}$ was seen at 20C (FIG. 21B). To test longer term cycling, the cell was cycled at 10C charge and 10C discharge rates for 500 cycles. Under these conditions, a capacity of 150 mA·h·g$^{-1}$ was observed, showing greater than 93% capacity retention (FIG. 21C).

Figure 22A:
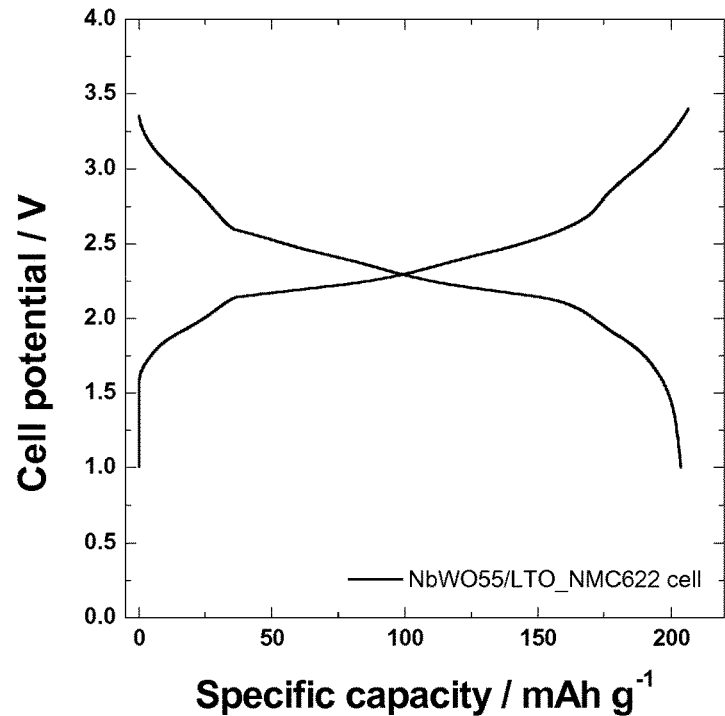
FIG. 22 shows (A) change and discharge profiles of a full cell comprising a 3:7 ($Nb_{16}W_5O_{55}$:LTO) anode and an NMC622 cathode and (B) rate performance of the cell.
Figure 22B:
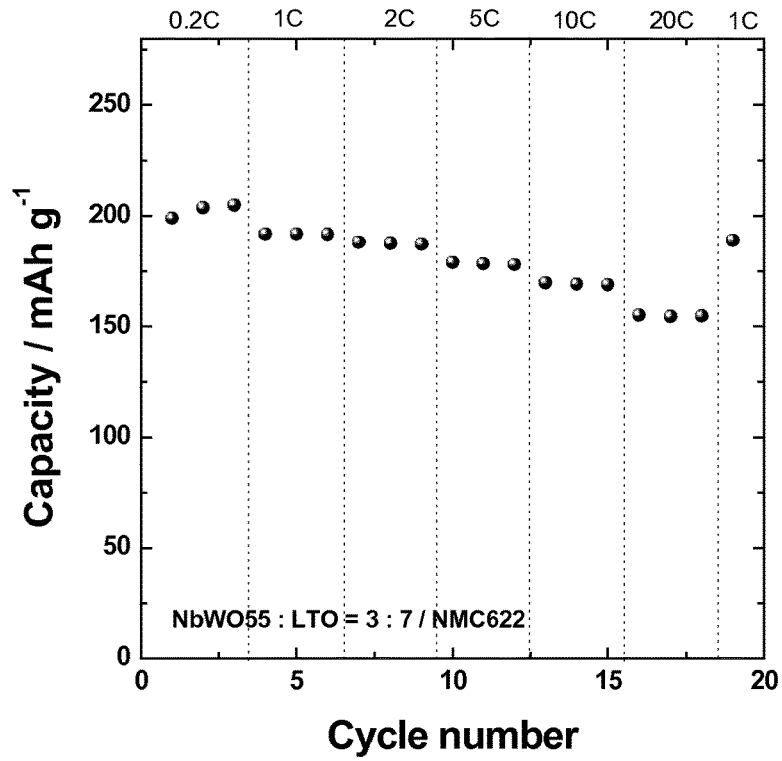

A full cell comprising a 3:7 (Nb$_{16}$W$_5$O$_{55}$:LTO) anode and an NMC622 cathode was prepared in a stainless steel 2032-coin cell with glass microfiber separator in the same manner as for Nb$_{16}$W$_5$O$_{55}$ and Nb$_{18}$W$_{16}$O$_{93}$ described above. The Nb$_{16}$W$_5$O$_{55}$, LTO, Super P carbon and PVDF were ground together to prepare an 80/15/5 active material/carbon/polymer anode. The NMC622, Li250 carbon and PVD were ground together as described above to prepare an 80/10/10 active material/carbon/polymer electrode which served as cathode. The electrolyte was 150 μL LP30. No additives were used The full cell was evaluated between 1.0 and 3.25 V, as shown in FIG. 22A. At a low rate of C/5 a capacity of 200 mA·h·g$^{-1}$ was observed. The average voltage was 2.25V. The rate performance of the full cell was evaluated in a range of current densities from C/5 to 20C. The full cell maintained a capacity of 160 mA·h·g$^{-1}$ at 20C, greater than 78% capacity retention relative to the capacity at C/5 (FIG. 22B).

Electrochemical Characterisation of Nb$_2$Mo$_3$O$_{14}$

Electrochemical characterisation of Nb$_2$Mo$_3$O$_{14}$ was conducted in the same manner as for Nb$_{16}$W$_5$O$_{55}$ and Nb$_{18}$W$_{16}$O$_{93}$ described above, using a stainless steel 2032-coin cell (Cambridge Energy Solutions) with a conical spring, two 0.5 mm stainless steel spacer disks, a plastic gasket, and a glass microfiber separator (Whatman). The metal oxide and conductive carbon (Super P, TIMCAL) were ground by hand in an agate mortar and pestle in an 8:1 mass ratio. This powder was ground in a 9:1 mass ratio with poly(vinylidene difluoride) (PVDF, Kynar) dispersed in N-methyl pyrrolidone (NMP, Sigma-Aldrich, anhydrous, 99.5%). This metal oxide/carbon/polymer electrode served as the cathode against a Li metal disk (LTS Research, 99.95%) anode in half-cell geometry. The electrolyte was 1 M LiPF$_6$ dissolved in 1:1 v/v ethylene carbonate/dimethyl carbonate (EC/DMC, Sigma-Aldrich, battery grade). No additives were used. Electrochemistry was performed in a temperature-controlled room at 293 K. A Biologic galvanostat/potentiostat with EC-Lab software was used to perform the electrochemical measurements.

Figure 15:
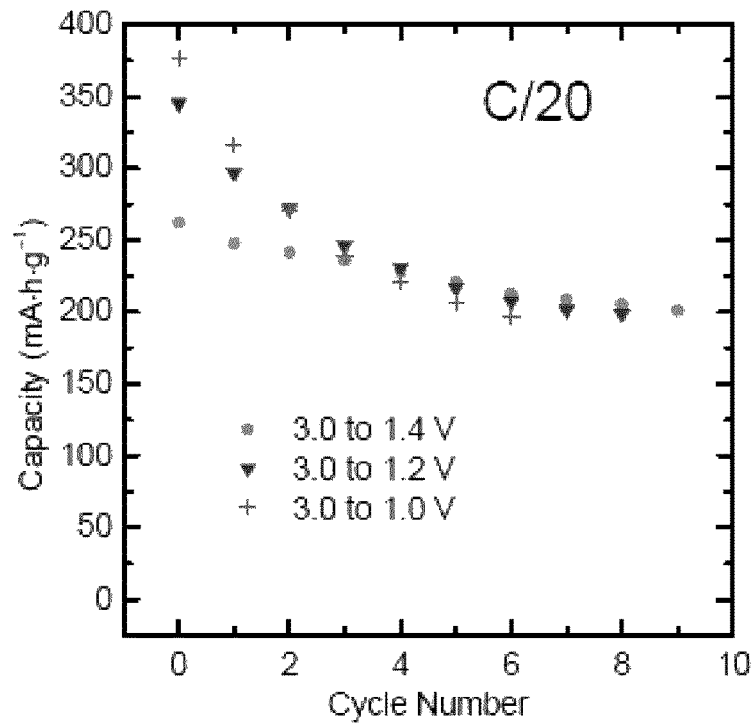
FIG. 15 shows the capacity versus cycle number for $Nb_2Mo_3O_{14}$ at 0.05C and from 1.0 to 3.0 V vs. $Li^+/Li$.
Figure 16:
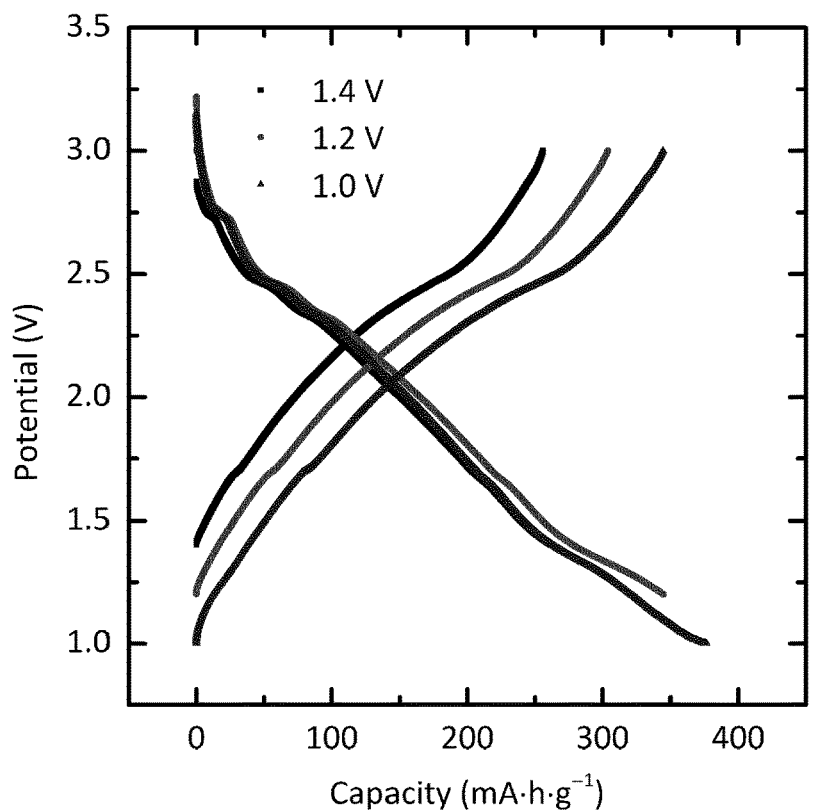
FIG. 16 shows discharge and charge voltage profiles of $Nb_2Mo_3O_{14}$ within three different voltage windows (1.0 V, 1.2 V and 1.4 V). The discharge and charge curves are normalized to gravimetric capacity; order of curves at 200 $mA \cdot h \cdot g^{-1}$: 1.4 V charging curve (topmost); 1.2 V charging curve (second from top); 1.0 V charging curve (third from top); 1.2 V discharging curve (third from bottom); 1.0 V discharging curve and 1.4 V discharging curve (overlapping; bottommost).

At C/20 it is possible to maintain a gravimetric capacity of ca. 200 mA·h·g$^{-1}$ (FIG. 15). Nb$_2$Mo$_3$O$_{14}$ displays an average voltage around 2.0 V. Thus, Nb$_2$Mo$_3$O$_{14}$ may be used in a voltage window of, for example 3.0 to 1.4 V, or 3.0 to 1.8 V, and still provide a high capacity at a high rate whilst avoiding or minimizing reaction with the electrolyte. This is advantageous as many prospective solid electrolyte materials react with low voltage anodes and this could be mitigated using a Nb$_2$Mo$_3$O$_{14}$ anode.

REFERENCES

All documents mentioned in this specification are incorporated herein by reference in their entirety.

Allpress and Roth, J. Solid State Chem. 1971, 3, 209-216.
Arbi, et al., MRS Online Proc. Libr. Arch. 2011, 1313.
Bork and Heitjans, J. Phys. Chem. B 1998, 102, 7303-7306.
Cruz, at al., Mater. Res. Bull. 2003, 38, 525-531.
Downiem et al., J. Electochem. Soc. 2013, 160, A588-A570.
Fuentes, et al., Solid State Ion. 1996, 92, 103-111.
Fuentes, et al., Solid State Ion. 1997, 93, 245-253.
Gobet, et al., Chem. Mater. 2014, 26, 3558-3564.
Griffith, et al., Inorg. Chem. 2017, 56, 4002-4010.
Hayamizu, et al., Solid State Ion. 2013, 238, 7-14.
Hayamizu, et al., Solid State Nucl. Magn. Reson. 2015, 70, 21-27.
Hayamizu, et al., Solid State Ion. 2016, 285, 51-58.
Hayamizu, et al., Phys. Chem. Chem. Phys. 2017, 19, 23483-23491.
Holzmann, et al. Energy Environ. Sci. 2016, 9, 2578-2585.
He at al., Sci. Rep. 2012, 2, 913.
Ishiyama, et al., Jpn. J. Appl. Phys. 2014, 53, 110303.
Ishiyama, et al., Nucl. Instrum. Methods Phys. Res. Sect. B Beam Interact. Mater. At. 2016, 376, 379-381.
Kasnatscheew, et al., J. Electrochem. Soc. 2017, 164, A2479-A2486.
Kim, et al., Adv. Funct. Mater. 2013, 23, 1214-1222.
Kuhn, et al., Phys. Rev. B 2011, 83, 094302.
Kuhn, et al., Energy Environ. Sci. 2013, 6, 3548-3552.
Kuhn, et al., Phys. Chem. Chem. Phys. 2014, 16, 14669-14674.
Langer et al., Phys. Rev. B 2013, 88, 094304.
Lv, et al., J. Electrochem. Soc. 2017, 164, A2213-A2224.
Mali, et al., J. Phys. F Met. Phys. 1988, 18, 403.
Montemayor, et al., J. Mater. Chem. 1998, 8, 2777-2781.
Odziomek, et al., Nat. Commun. 2017, 8, 15636.
Oszajca, et al., Chem. Mater. 2014, 26, 5422-5432.
Palacin, et al., Acta Chim. Solv. 2016, 63, 417-423.
Roth and Wadsley, Acta Crystallogr. 1965, 19, 26-32.
Roth and Wadsley, Acta Crystallogr. 1965, 19, 32-38.
Ruprecht, et al., Phys. Chem. Chem. Phys. 2012, 14, 11974-11980.
Ruprecht and Heitjans, Diffusion Fundamentals 2010, 12, 101.
Saritha, et al., J. Solid State Chem. 2010, 183, 988-993.
Stephenson, Acta Crystallogr. B 1968, 24, 673-653.
Sugiyama, et al., Phys. Rev. B 2015, 92, 014417.
Sun, et al., Science 2017, 356, 599-604.
Toby and Von Dreele, J. Appl. Crystallogr. 2013, 46, 544-549.
Verhoevenm, et al. Phys. Rev. Lett. 2001, 86, 4314-4317.
Wagemaker, et al., J. Am. Chem. Soc. 2001, 123, 11454-11461.
Wagemaker, et al., Chem.—Eur. J. 2007, 13, 2023-2028.
Wang, et al., Nano Energy, 2016, 21, 133-144.
Waring, et al., J. Res. Nat. Bur. Stand. Sec. A 1966, 70A, 281-303.
Wilkening, et al. Phys. Chem. Chem. Phys. 2007, 9, 6199-6202.
Wu, at al., Nat. Nanotechnol. 2012, 7, 310-315.
Yamada, et al. Solid State Ion. 2001, 140, 249-255.
Yamada, et al., Mater. Res. Bull. 1999, 34, 955-962.
Yan, et al., J. Mater. Chem. A 2017, 5, 8972-8980.
Zaghib, et al., Mater. Basel Switz. 2013, 6, 1028-1049.
Zhao, at al., J. Appl. Phys. 2010, 108, 073517.

The invention claimed is:

1. An electrochemical cell comprising an electrode, wherein the electrode comprises niobium tungsten oxide, wherein the ratio of Nb$_2$O$_5$ to WO$_3$ in the electrode is from 8:5 to 11:20, the niobium tungsten oxide is an active material, and the electrode is the anode during discharge of the electrochemical cell.

2. The electrochemical cell of claim 1, wherein the electrode comprises Nb$_{16}$W$_5$O$_{55}$, Nb$_{18}$W$_8$O$_{69}$, Nb$_2$WO$_8$, Nb$_{18}$W$_{16}$O$_{93}$, or Nb$_{22}$W$_{20}$O$_{115}$, or combinations thereof.

3. The electrochemical cell of claim 1, wherein the electrode comprises Nb$_{16}$W$_5$O$_{55}$ or Nb$_{18}$W$_{16}$O$_{93}$.

4. The electrochemical cell of claim 1, wherein the electrode comprises a mixture of a niobium tungsten oxide and an additional active material.

5. The electrochemical cell of claim 1, wherein the electrode does not have a porous nor hierarchical structure.

6. The electrochemical cell of claim 1, wherein the electrode comprises a niobium tungsten oxide in particulate form.

7. The electrochemical cell of claim 1, in a lithium ion battery.

8. The electrochemical cell of claim 1, in a vehicle.

* * * * *